United States Patent
Goyal et al.

(10) Patent No.: US 11,960,930 B2
(45) Date of Patent: *Apr. 16, 2024

(54) AUTOMATED SOFTWARE ROBOT CREATION FOR ROBOTIC PROCESS AUTOMATION

(71) Applicant: Automation Anywhere, Inc., San Jose, CA (US)

(72) Inventors: Ranjna Garg Goyal, Santa Clara, CA (US); Radek Hecl, Tokyo (JP); Narayanan Seshadri, Pleasanton, CA (US); Niveditha Nataraj, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,126

(22) Filed: Jun. 27, 2023

(65) Prior Publication Data
US 2023/0385104 A1 Nov. 30, 2023

Related U.S. Application Data

(63) Continuation of application No. 17/096,908, filed on Nov. 12, 2020, now Pat. No. 11,734,061.

(51) Int. Cl.
*G06F 9/48* (2006.01)
(52) U.S. Cl.
CPC .......... *G06F 9/4881* (2013.01); *G06F 9/4843* (2013.01)
(58) Field of Classification Search
CPC ............................. G06F 9/4881; G06F 9/4843
See application file for complete search history.

(56) References Cited

U.S. PATENT DOCUMENTS

| | | | |
|---|---|---|---|
| 5,949,999 A | 9/1999 | Song et al. | |
| 5,983,001 A | 11/1999 | Boughner et al. | |
| 6,133,917 A | 10/2000 | Feigner et al. | |
| 6,226,407 B1 | 5/2001 | Zabih et al. | |
| 6,389,592 B1 | 5/2002 | Ayres et al. | |
| 6,427,234 B1 | 5/2002 | Chambers et al. | |
| 6,473,794 B1 | 10/2002 | Guheen et al. | |
| 6,496,979 B1 | 12/2002 | Chen et al. | |
| 6,640,244 B1 | 10/2003 | Bowman-Amuah | |

(Continued)

FOREIGN PATENT DOCUMENTS

| | | |
|---|---|---|
| WO | 2019/092672 A2 | 5/2019 |
| WO | 2022/076488 | 4/2022 |

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Van H Nguyen

(57) ABSTRACT

Improved techniques for combining a plurality of distinct recordings pertaining to user interactions with one or more software applications each of which concerns performing a task. Then, the combined recording can be used to form a software automation process for performing the task in an automated fashion. Advantageously, the improved techniques enable a robotic process automation (RPA) system to capture multiple recordings, combine (e.g., merge) the recordings, and form a software automation process to perform repetitive tasks in an automated manner, all with little or no assistance from a user.

21 Claims, 18 Drawing Sheets

(56) References Cited

U.S. PATENT DOCUMENTS

| | | |
|---|---|---|
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Folev |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,946,233 B2 | 4/2018 | Brun et al. |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,706,218 B2 | 7/2020 | Milward et al. |
| 11,176,443 B1 | 11/2021 | Selva |
| 11,182,178 B1 | 11/2021 | Singh et al. |
| 11,243,803 B2 | 2/2022 | Anand et al. |
| 11,348,353 B2 | 5/2022 | Sundell et al. |
| 11,614,731 B2 | 3/2023 | Anand et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0101291 A1 | 5/2007 | Forstall et al. |
| 2007/0112574 A1 | 5/2007 | Greene |
| 2007/0156677 A1 | 7/2007 | Szabo |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Folev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0324333 A1 | 12/2012 | Lehavi |
| 2012/0330940 A1 | 12/2012 | Caire et al. |
| 2013/0173648 A1 | 7/2013 | Tan et al. |
| 2013/0236111 A1 | 9/2013 | Pintsov |
| 2013/0290318 A1 | 10/2013 | Shapira et al. |
| 2014/0036290 A1 | 2/2014 | Miyagawa |
| 2014/0045484 A1 | 2/2014 | Kim et al. |
| 2014/0181705 A1 | 6/2014 | Hey et al. |
| 2014/0189575 A1 | 7/2014 | Carmi |
| 2015/0082280 A1 | 3/2015 | Betak et al. |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0078368 A1 | 3/2016 | Kakhandiki et al. |
| 2017/0270431 A1 | 9/2017 | Hosabettu |
| 2018/0113781 A1 | 4/2018 | Kim |
| 2018/0218429 A1 | 8/2018 | Guo et al. |
| 2018/0275835 A1 | 9/2018 | Prag |
| 2019/0005050 A1 | 1/2019 | Proux |
| 2019/0028587 A1 | 1/2019 | Unitt |
| 2019/0126463 A1 | 5/2019 | Purushothaman |
| 2019/0141596 A1 | 5/2019 | Gay |
| 2019/0188462 A1 | 6/2019 | Nishida |
| 2019/0213822 A1 | 7/2019 | Jain |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0097742 A1 | 3/2020 | Kumar et al. |

(56) References Cited

U.S. PATENT DOCUMENTS

2020/0151591 A1  5/2020 Li
2022/0245936 A1  8/2022 Valk

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, dated Oct. 14, 2022.
Notice of Allowance for U.S. Appl. No. 16/398,532, dated Oct. 23, 2022.
Non-Final Office Action for U.S. Appl. No. 16/876,530, dated Sep. 29, 2020.
Final Office Action for U.S. Appl. No. 16/876,530, dated Apr. 13, 2021.
Notice of Allowance for U.S. Appl. No. 16/876,530, dated Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
Ren, Shaoqing et al., "Faster r-cnn: Towards realtime object detection with region proposal network." Advances in neutral information processing systems 28 (2015). (Year: 2015).
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, dated Sep. 16, 2021.
Notice of Allowance for U.S. Appl. No. 16/925,956, dated Jan. 7, 2022.
Pre-Interview Office Action for U.S. Appl. No. 16/398,532, dated Jul. 8, 2022.
Notice of Allowance for U.S. Appl. No. 16/398,532, dated Jul. 8, 2022.
Non-Final Office Action for U.S. Appl. No. 17/139,838, dated Feb. 22, 2022.
Final Office Action for U.S. Appl. No. 17/139,838, dated Nov. 15, 2023.
Notice of Allowance for U.S. Appl. No. 17/139,838, dated Apr. 5, 2023.
International Search Report and Written Opinion for PCT/US2021/015691, dated May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Muhammad et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, dated Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 dated Feb. 9, 2022.

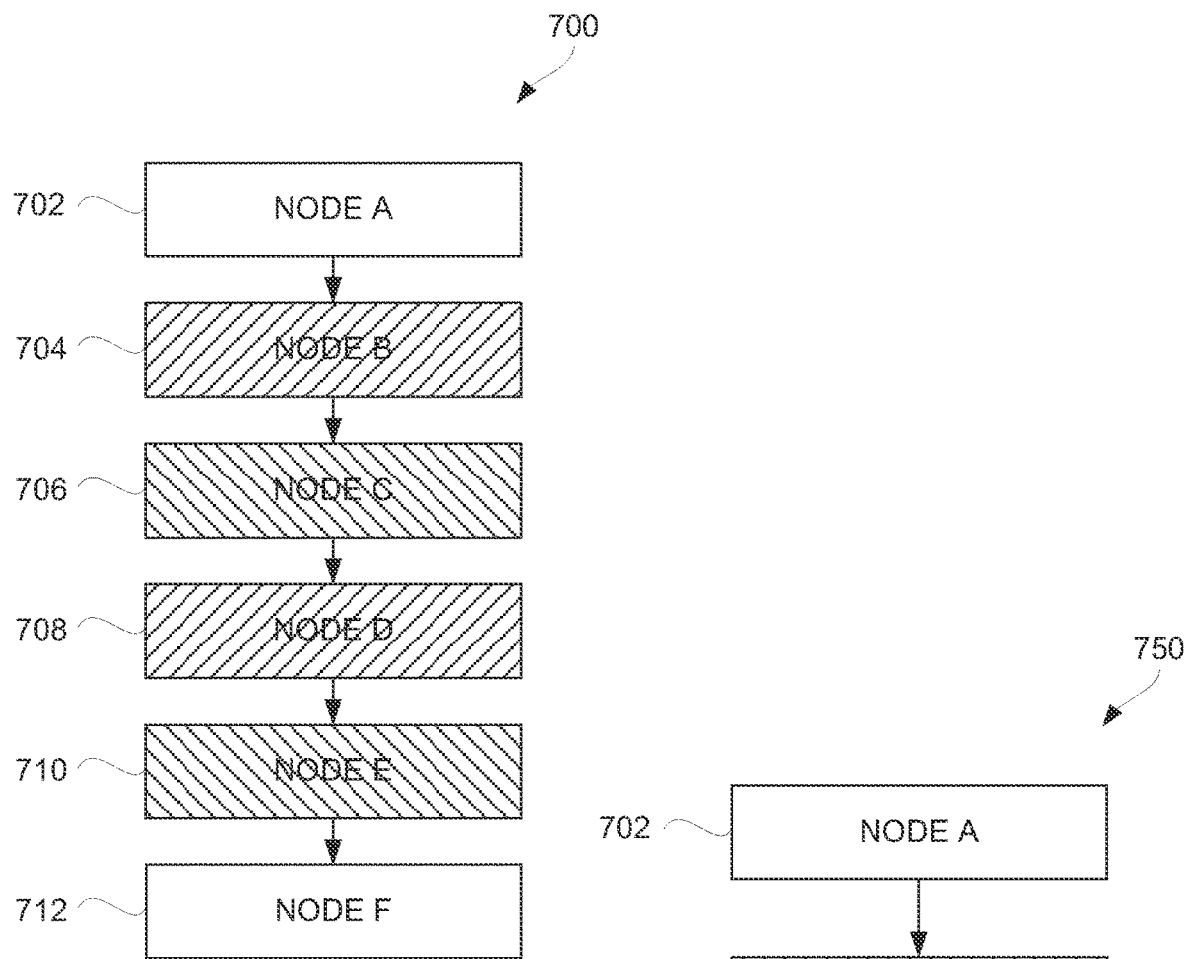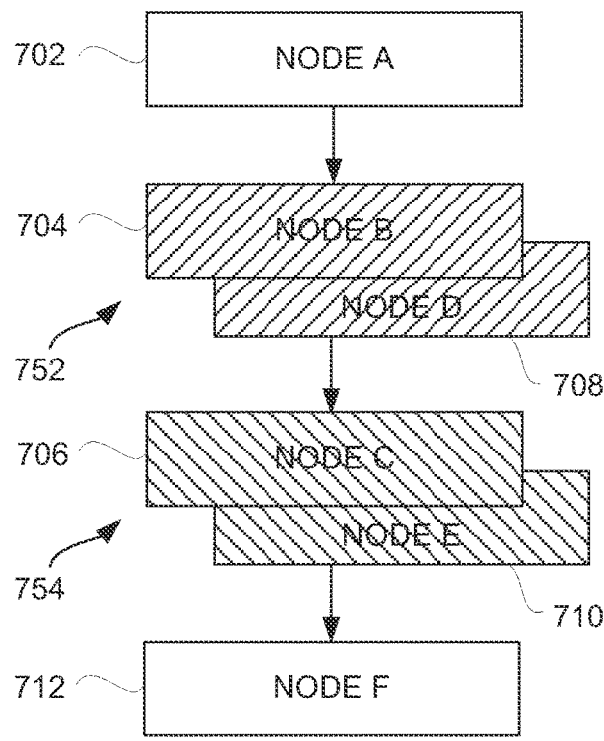
FIG. 7A
FIG. 7B

AUTOMATED SOFTWARE ROBOT CREATION FOR ROBOTIC PROCESS AUTOMATION

CROSS-REFERENCE TO RELATED APPLICATION

This application is a continuation of U.S. application Ser. No. 17/096,908, filed Nov. 12, 2020, and entitled "AUTOMATED SOFTWARE ROBOT CREATION FOR ROBOTIC PROCESS AUTOMATION," (now U.S. Pat. No. 11,734,061), which is hereby incorporated herein by reference in its entirety.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

RPA systems have generally assisted users in creating software robots that mimic user interactions with software applications to perform various tasks. However, the creation of software robots is not so straight forward because the user interactions for a given task, even though generally repeated, can often have slight variances. As such, creation of a software robot to perform these same tasks conventionally requires significant user effort to create the software robot, including some knowledge about creating software robots and possibly even some programming knowledge.

Therefore, there is a need for improved approaches to create software robots for RPA systems that require only minimal user effort and domain knowledge.

SUMMARY

Embodiments disclosed herein concern improved techniques for combining a plurality of distinct recordings pertaining to user interactions with one or more software applications each of which concerns performing a task. Then, the combined recording can be used to form a software automation process for performing the task in an automated fashion. Advantageously, the improved techniques enable a robotic process automation (RPA) system to capture multiple recordings, combine (e.g., merge) the recordings, and form a software automation process to perform repetitive tasks in an automated manner, all with little or no assistance from a user.

The invention can be implemented in numerous ways, including as a method, system, device, apparatus (including computer readable medium and graphical user interface). Several embodiments of the invention are discussed below.

As a robotic process automation system, one embodiment can, for example, include at least: a data store, at least one recording pre-processor, an aggregator, and a software automation process generator. The data store can be configured to store a plurality of recordings, and each recording can pertain to a series of user-initiated events with one or more software programs operating on one or more computing devices. The at least one recording pre-processor can be configured to (i) process each of the one or more of the recordings to determine identifiers for the user-initiated events within the each of the one or more recordings, (ii) form a digital representation for each of the one or more recordings, and (iii) examine each of the one or more recordings for repeating sequence of events in the corresponding recording. The aggregator can be configured to combine two or more of the digital representations for two or more the recordings to form an aggregated recording digital representation. The software automation process generator can be configured to create a software automation process based on the aggregated recording digital representation.

As a computer-implemented method for creating a software automation process for use with a robotic process automation system, one embodiment can, for example, include at least: receiving a first recording identifying a first series of user-initiated events with one or more software programs operating on one or more computing devices; receiving a second recording identifying a second series of user-initiated events with one or more software programs operating on one or more computing devices; determining a plurality of contextual identifiers for each of the user-initiated events in the first series of user-initiated events from the first recording; determining a plurality of contextual identifiers for each of the user-initiated events in the second series of user-initiated events from the second recording; identifying one or more events from the user-initiated events in the first series of user-initiated events that match one or more events from the user-initiated events in the second series of events, the identifying of the one or more events that match is performed based at least on the plurality of contextual identifiers that correspond to the one or more events; combining the first series of user-initiated events from the first user recording with the second series of user-initiated events from the second user recording to form a combined representation, the combining being dependent on the identified one or more events that match; and producing a software automation process to carry out the combined representation.

As a computer-implemented method for creating a software automation process for use with a robotic process automation system, one embodiment can, for example, include at least: receiving a first recording identifying a first series of user-initiated events with one or more software programs operating on one or more computing devices; receiving a second recording identifying a second series of user-initiated events with one or more software programs operating on one or more computing devices; determining a plurality of contextual identifiers for each of the user-initiated events in the first series of user-initiated events; determining a plurality of contextual identifiers for each of the user-initiated events in the second series of user-initiated events; forming a digital representation for the first recording, the digital representation for the first recording including at least the user-initiated events in the first series of user-initiated events and the plurality of contextual identifiers therefor; forming a digital representation for the second recording, the digital representation for the second recording including at least the user-initiated events in the second series of user-initiated events and the plurality of contextual identifiers therefor; combining the digital representation for the first recording with the digital representation for the second recording to form a combined digital representation; and producing a software automation process to carry out the combined representation, whereby the user-initiated events from the first recording and the second recording are able to be programmatically performed without user interaction by execution of the software automation process.

As a non-transitory computer readable medium including at least computer program code tangible stored thereon for merging recordings for use with a robotic process automation system, one embodiment can, for example, include at least: computer program code for receiving a first recording identifying a first series of user-initiated events with one or more software programs operating on one or more computing devices; computer program code for receiving a second recording identifying a second series of user-initiated events with one or more software programs operating on one or more computing devices; computer program code for determining a plurality of contextual identifiers for each of the user-initiated events in the first series of user-initiated events; computer program code for determining a plurality of contextual identifiers for each of the user-initiated events in the second series of user-initiated events; computer program code for identifying one or more events from the user-initiated events in the first series of user-initiated events that match one or more events from the user-initiated events in the second series of events, the identifying of the one or more events that match is performed based at least on the plurality of contextual identifiers that correspond to the one or more events; and computer program code for merging the first series of user-initiated events from the first user recording with the second series of user-initiated events from the second user recording to form a combined representation, the merging being dependent on the identified one or more events that match.

As a non-transitory computer readable medium including at least computer program code tangible stored thereon for creating a software automation process for use with a robotic process automation system, one embodiment can, for example, include at least: computer program code for receiving a first recording identifying a first series of user-initiated events with one or more software programs operating on one or more computing devices; computer program code for receiving a second recording identifying a second series of user-initiated events with one or more software programs operating on one or more computing devices; computer program code for determining a plurality of contextual identifiers for each of the user-initiated events in the first series of user-initiated events; computer program code for determining a plurality of contextual identifiers for each of the user-initiated events in the second series of user-initiated events; computer program code for forming a digital representation for the first recording, the digital representation for the first recording including at least the user-initiated events in the first series of user-initiated events and the plurality of contextual identifiers therefor; computer program code for forming a digital representation for the second recording, the digital representation for the second recording including at least the user-initiated events in the second series of user-initiated events and the plurality of contextual identifiers therefor; computer program code for combining the digital representation for the first recording with the digital representation for the second recording to form a combined digital representation; and computer program code for producing a software automation process to carry out the combined representation, whereby the user-initiated events from the first recording and the second recording are able to be programmatically performed without user interaction by execution of the software automation process.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 7A is a flow diagram of an exemplary flowchart of a recording prior to transformation processing.

FIG. 7B is a flow diagram of an exemplary flowchart that represents the exemplary flowchart illustrated in FIG. 7A after transformation processing.

DETAILED DESCRIPTION OF CERTAIN EMBODIMENTS

Figure 1:
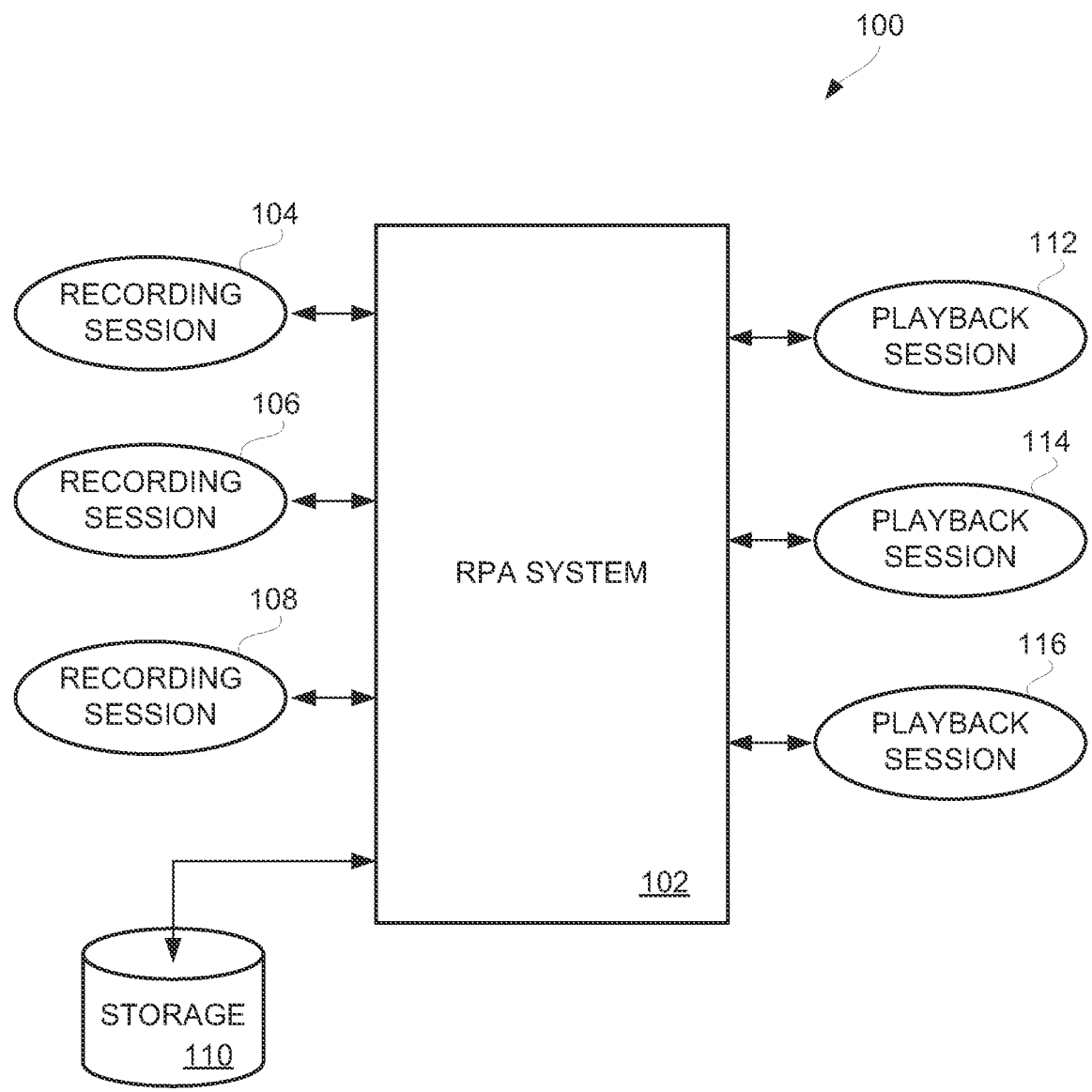
FIG. 1 is a simplified block diagram of a robotic process automation (RPA) utilization environment according to one embodiment.

Embodiments disclosed herein concern improved techniques for combining a plurality of distinct recordings pertaining to user interactions with one or more software applications each of which concerns performing a task. Then, the combined recording can be used to form a software automation process for performing the task in an automated fashion. Advantageously, the improved techniques enable a robotic process automation (RPA) system to capture multiple recordings, combine (e.g., merge) the recordings, and form a software automation process to perform repetitive tasks in an automated manner, all with little or no assistance from a user.

Generally speaking, RPA systems use computer software to emulate and integrate the actions of a human interacting within digital systems. In an enterprise environment, these RPA systems are often designed to execute a business process. In some cases, the RPA systems use AI and/or other machine learning capabilities to handle high-volume, repeatable tasks that previously required humans to perform. The RPA systems support a plurality of software automation processes (SAPs). The RPA systems also provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow they are tasked with once or 10,000 times and do it consistently and reliably every time. As one example, a software automation process can locate and read data in a document, email, file, or window. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, etc. As another example, a software automation process can grab data desired from a webpage, application, screen, file, or other data source. As still another example, a software automation process can be triggered based on time or an event, and can serve to take files or data sets and move them to another location, whether it is to a customer, vendor, application, department, or storage. These various capabilities can also be used in any combination. As an example of an integrated software automation process, the software automation process can start a task or workflow based on a trigger, such as a file being uploaded to a file transfer protocol (FTP) system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-17. However, those skilled in the art will readily appreciate that the detailed description given herein with respect to these figures is for explanatory purposes as the invention extends beyond these limited embodiments.

FIG. 1 is a simplified block diagram of a robotic process automation (RPA) utilization environment 100 according to one embodiment. The RPA utilization environment 100 serves to support recordation of a series of user interactions of a user with one or more application programs operating on a computing device. In the case that the recording pertains to a same or similar task, the recording can sometimes be merged to yield an aggregated recording. Such an aggregated recording can permit the RPA system 102 to better assist users in creating software automation processes, with little or no assistance from users. Then, the RPA system 102, using the created software automation process, can subsequently provide programmatic playback of the aggregated recording with the same one or more application programs operating on the same or different computing device. Programmatic playback refers to the notion that the playback is undertaken by a computer program, as opposed to a user.

The RPA utilization environment 100 can include a RPA system 102. The RPA system 102 supports creation, storage and execution of software automation processes. These software automation processes can be referred to as "software robots" or "bots". In the simplified block diagram shown in FIG. 1, the RPA system 102 supports one or more recording sessions. As an example, FIG. 1 illustrated that the RPA system 102 can receive or include recording sessions 104, 106 and 108. Each recording session denotes a series of user interactions with one or more application programs operating on a computing device, which can be recorded and stored by RPA system 102.

In general, a recording is an electronic record of a series of user interactions, such as actions or events, with one or more software programs operating on one or more computing devices. The recording can be stored in an electronic file. The data stored within the electronic file can denote the order in which the user interactions occurred. The electronic file can, for example, use a structured format, such as a JSON format, to detail the data within the recording. The recording can also include a screenshot captured during an action with respect to a user interface provided by the one or more software programs. Such a screenshot can be useful to further evaluate the recording steps as well as to assist with subsequent merge operations. In one implementation, each recording can be stored in a directory with separate JavaScript Object Notation (JSON) file for each action or event and with file names for the JSON files denoting their order. JSON is a standard text-based format for representing structured data based on JavaScript object syntax. In one implementation, each recording can be stored in a directory with separate JSON files for each action or event, with file names for the JSON files denoting their order.

The recording from one or more of the recording sessions 104, 106 and 108 can be used by the PRA system 102 to create a software automation process. The series of user interactions from a plurality of recordings can be aggregated and then utilized by the RPA system 102 to form a software automation process (e.g., bot) for carrying out such actions in an automated manner. The RPA utilization environment 100 can include a storage 110 for storage of the software automation processes (e.g., bots) that have been created.

In addition, the RPA system 102 can further support the execution of the one or more software automation processes that have been created by the RPA system 102 and stored to the storage 110. Execution (or running) of a software automation process at a computing device can cause playback of the software automation process. That is, when a software automation process is executed or run by one or more computing devices, the software automation process is being "played back" or undergoing "playback." The RPA system 102 can support the execution of a software automation process in any of a plurality of different playback sessions 112, 114 and 116. In this example, for illustration purposes, there are depicted three distinct playback sessions 112, 114 and 116. These playback sessions 112, 114 and 116 can each execute the same or different software automation processes.

Figure 2:
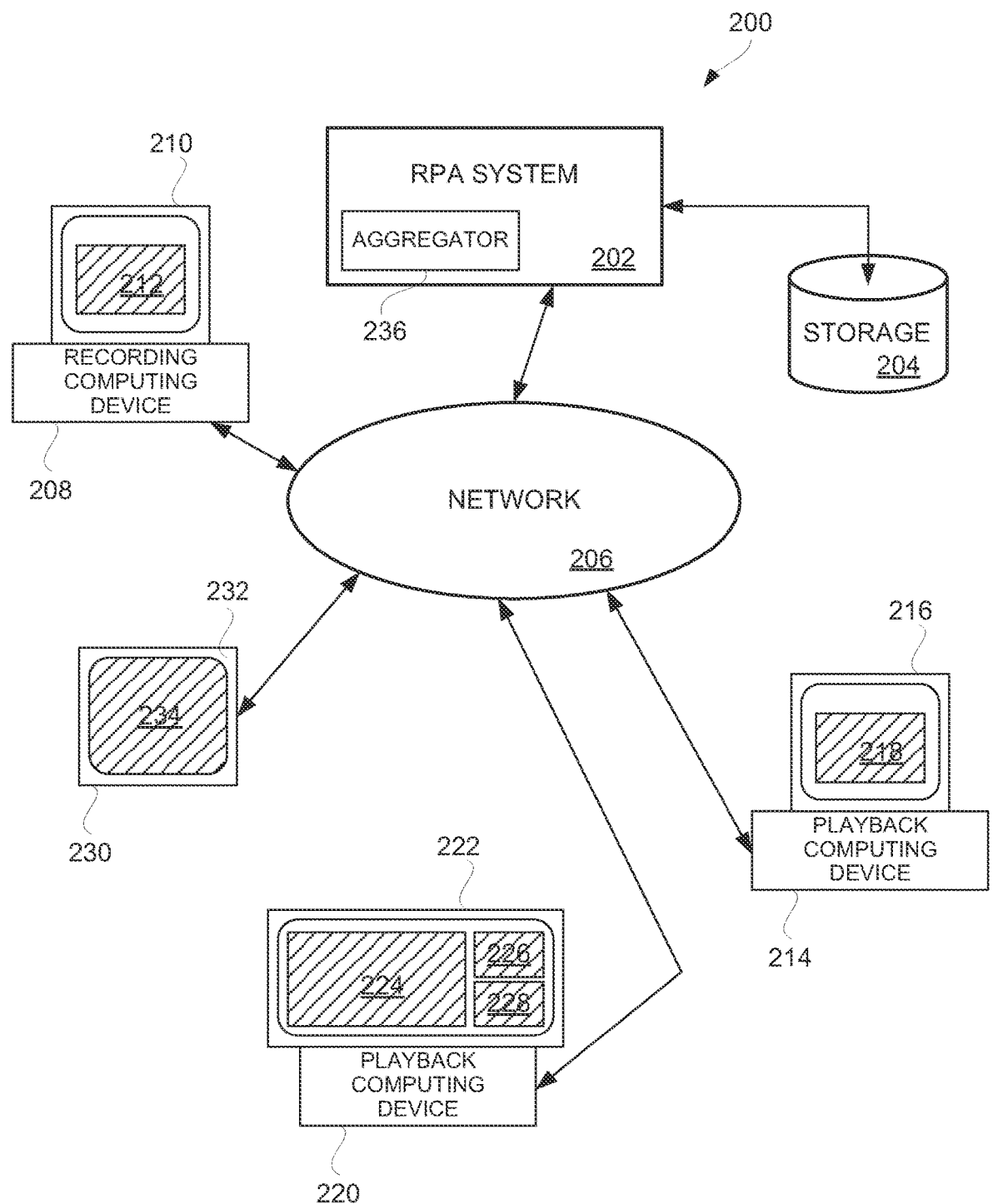
FIG. 2 is a block diagram of a computing environment according to one embodiment.

FIG. 2 is a block diagram of a computing environment 200 according to one embodiment. The computing environment 200 includes an RPA system 202. The RPA system 202 is, for example, similar to the RPA system 102 illustrated in FIG. 1. The RPA system 202 can be coupled to a storage 204 for storage of software automation processes (e.g., bots). The storage 204 can, for example, be similar to the storage 110 illustrated in FIG. 1.

Additionally, the computing environment 200 can support various different types of computing devices that can interact with the RPA system 202. The computing environment 200 can also include a network 206 made up of one or more wired or wireless networks that serve to electronically interconnect various computing devices, such as for data transfer. These computing devices can be, for example, a recording computing device, a playback computing device, or both, or any other computing devices. As shown in FIG. 2, the computing environment 200 can include a recording computing device 208 that includes a display device 210 and a window 212 presented on the display device 210. The window 212 can, in one example, depict a user interface that is associated with recording user interactions with one or more application programs to produce a software automation process using the RPA system 202.

The computing environment 200 shown in FIG. 2 also includes various playback computing devices. A first playback computing device 214 includes a display device 216 that can present a window 218. A second playback computing device 220 includes a display device 222 that can present a first window 224, a second window 226 and a third window 228. The number of windows is not intended to be limiting and can be any number of windows desired by the user and/or to complete the desired task. A third playback computing device 230 includes a display device 232 that can present a window 234. More generally, the windows are screens that are presented and visible on respective display devices.

The RPA system 202 can also include an aggregator 236. The aggregator 236 can be used to consolidate multiple recordings into a single recording. For example, a plurality of separate recordings that were made following a series of user-initiated interactions with one or more software programs can be combined into a more robust recording. Typically, these separate recordings will be directed to the same overall task of the recording, and thus the combined recording is able to be more complete and used in achieving the overall task involved.

Figure 3:
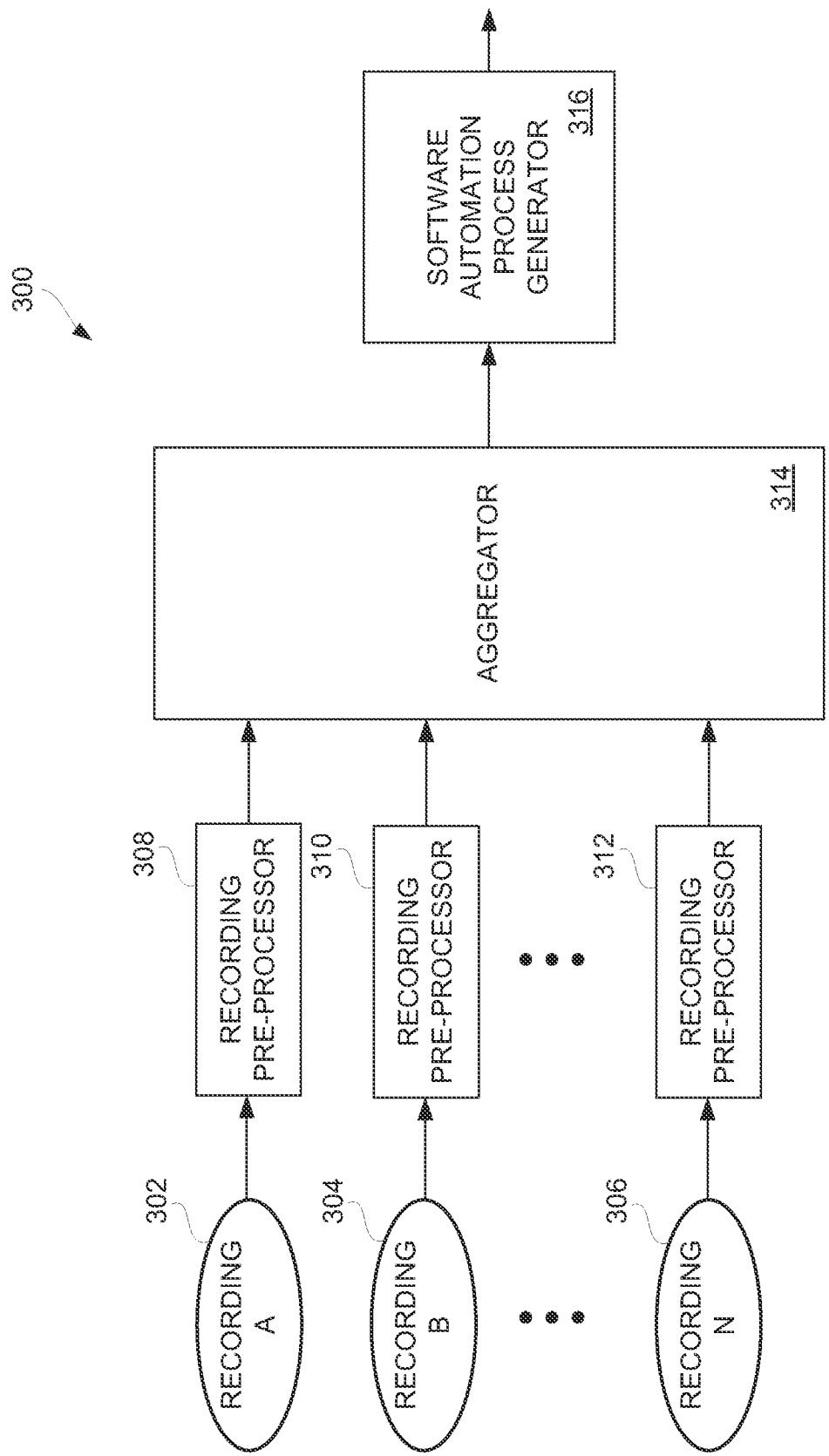
FIG. 3 is a block diagram of a RPA system according to one embodiment.

FIG. 3 is a block diagram of an RPA system 300 according to one embodiment. The RPA system 300 can operate to receive a plurality of recordings. In particular, the RPA system 300 illustrated in FIG. 3 can receive a plurality of recordings, such as recording A 302, recording B 304, and up through recording N 306, where N is an integer.

The RPA system 300 can also include a recording pre-processor for each of the plurality recordings. In this regard, the RPA system 300 can include a recording pre-processor 308 that receives the recording A 302 and outputs a digital representation pertaining to recording A 302. The RPA system 300 can also include a recording pre-processer 310 that receives the recording B 304 and outputs a digital representation pertaining to recording B 304. Similarly, the RPA system 300 further includes a recording pre-processor 312 that receives the recording N 306 and outputs a digital representation pertaining to recording N 306.

In one embodiment, pre-processing can begin by storing data from the electronic files of the recordings into a table in a database. The database table, for a given step in a given recording, can store a recording-step key and various attributes for such step. The attributes can vary with implementation. However, some exemplary attributes include one or more of: application name, action name, action value, user interface ("UI") criteria name, and class name. As examples, application name can pertain to explorer, chrome, java, and other similar names; action value can pertain to LEFT_CLICK, SET_TEXT, and other similar values; action value can pertain to clientAction, buttonAction, textboxAction, and other similar values; UI criteria name can pertain to Recorder warning, New Tab, Close, and other similar criteria names; and class name can pertain to Chrome_WidgetWin_1, GlassWndClass-GlassWindowClass-3), and other similar class names.

Table I provided below provides an example of a database table for storing data from a recording.

TABLE I

| Recording-Step Key | Application Name | Action Type | Action Value |
|---|---|---|---|
| 10-1 | Chrome | clientAction | LEFT_CLICK |
| 10-2 | Chrome | textboxAction | SET_TEXT |
| 10-3 | Chrome | clientAction | LEFT_CLICK |
| 11-1 | Explorer | menuAction | SELECT_ITEM_BY_TEXT |
| 11-2 | Explorer | buttonAction | CLICK |

In the example shown in Table I, the database table can include a recording-step key, which can be formatted as a recording number (e.g., 10 or 11) together with a step number (e.g., 1, 2, 3, . . . ) in the recording. The attributes recorded in the database table for each of the steps in a given recording can then, for example, include application name, action name, and action type.

Additionally, from the attributes associated with a given step of a recording, a fingerprint can be determined for that step. The fingerprint is a contextual identifier for a step. The determined fingerprints can be stored in the database table or another data structure (e.g., a map object stored in JAVA memory). In one embodiment, a fingerprint can be computed as a hashing function of some or all of its associated attributes. An attribute can also be empty and not prevent the production of a fingerprint. Although numerous hashing function can be used, one example of a suitable hashing function is the standard Java Objects.hash method.

The digital representation for a recording can be the above-noted attribute table with the associated fingerprints. That is, the digital representation is able to correlate those fingerprints to steps within a recording. In one implementation, the digital representation for each recording can be a linear flowchart. A linear flowchart describes the sequence of steps in a recording. The linear flowchart can provide a textual outline. Optionally, the linear flowchart can be presented visually by rendering the textual outline. A linear flowchart can provide a visual representation of one recording or an aggregation of a plurality of recordings in a simple flow that is easy to understand while traveling from top to the bottom of the flow.

The RPA system 300 also includes an aggregator 314. The aggregator 314 receives one or more digital representations pertaining to one or more recordings, and serves to aggregate, i.e., combine, the recordings into a merged recording, which is represented as a merged digital representation. That is, the aggregator 314 is merging the one or more recordings by effectively merging the digital representations that correspond to such recordings.

The merged digital representation being produced by the aggregator 314 can then be provided to a software automation process generator 316. The software automation process generator 316 can be included within the RPA system 300 and can be configured to convert the merged digital representation into a software automation process (e.g., bot). The resulting software automation process can then be executed (e.g., run) by the RPA system 300 to perform software automation in accordance with the merged digital representation.

In one implementation, the digital representation for each of the recordings can be a linear flowchart. The merging of the digital representations for such recordings can then merge each of the linear flowcharts, for each of the recordings, to create the merged digital representation. The linear flowcharts provide a textual outline for the merged recording that is code compatible. For example, the textual outline for the linear flowcharts can be presented in JSON format. As a result, the merged digital representation can be readily converted into a software automation process.

Figure 4A:
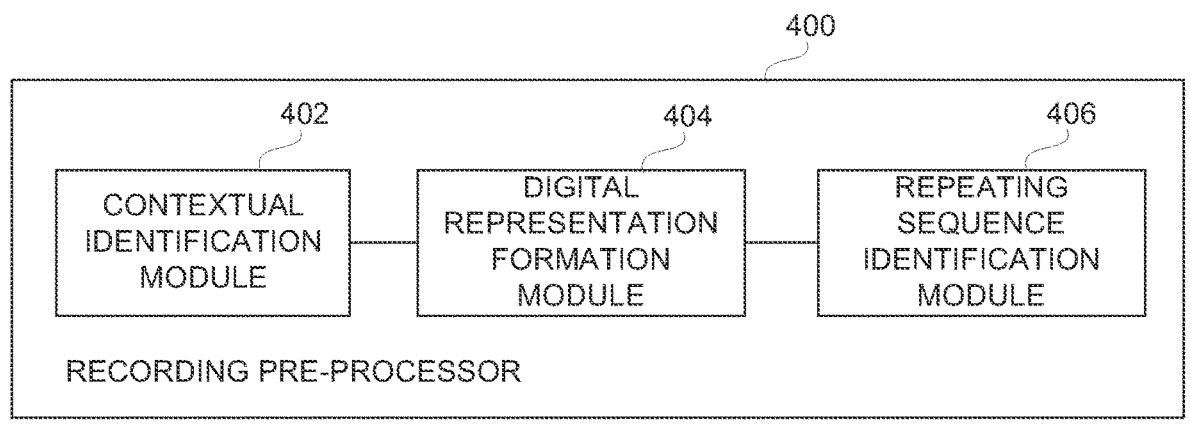
FIG. 4A is a block diagram of a recording pre-processer according to one embodiment.

FIG. 4A is a block diagram of a recording pre-processor 400 according to one embodiment. The recording pre-processor 400 illustrated in FIG. 4A is, for example, suitable for use as an embodiment of one or more of the recording pre-processors 308, 310 or 312 illustrated in FIG. 3.

The recording pre-processor 400 can include a contextual identification module 402. The contextual identification module 402 can provide contextual identifiers for each user-initiated event of a recording being processed. The recording pre-processor 400 can also include a digital representation formation module 404. The digital representation formation module 404 can convert a recording into a digital representation. The digital representation is code compatible and can include the contextual identification information that was provided by the contextual identification module 402. The recording pre-processor 400 can further include a repeating sequence identification module 406. The repeating sequence identification module 406 can identify one or more repeating sequences that are present within a recording, and then suitably modifying the digital representation for the recording to denote such one or more repeating sequences.

Figure 4B:
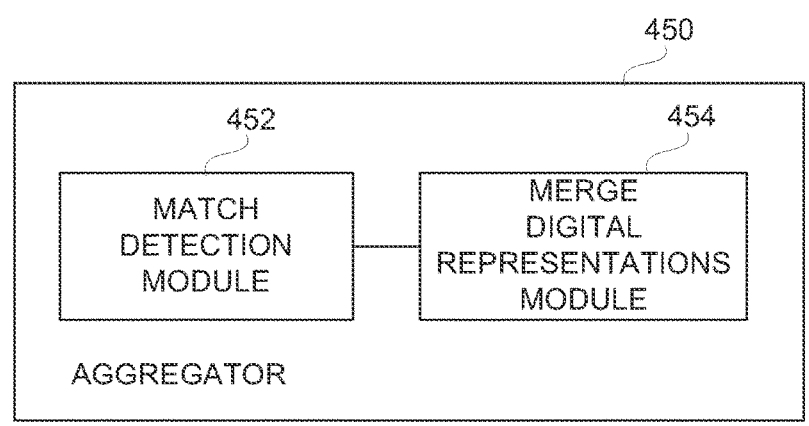
FIG. 4B is a diagram of an aggregator according to one embodiment.

FIG. 4B is a diagram of an aggregator 450 according to one embodiment. The aggregator 450 can, for example, pertain to the aggregator 314 illustrated in FIG. 3. The aggregator 450 can include a matched detection module 452 and a merge digital representations module 454. The matched detection module 452 can determine matching user-initiated events that occur in different recordings. Then, the merge digital representations module 454 can operate to merge digital representations for different recordings into a single digital representation while making use of matched detection information that has been determined by the matched detection module 452.

Figure 5:
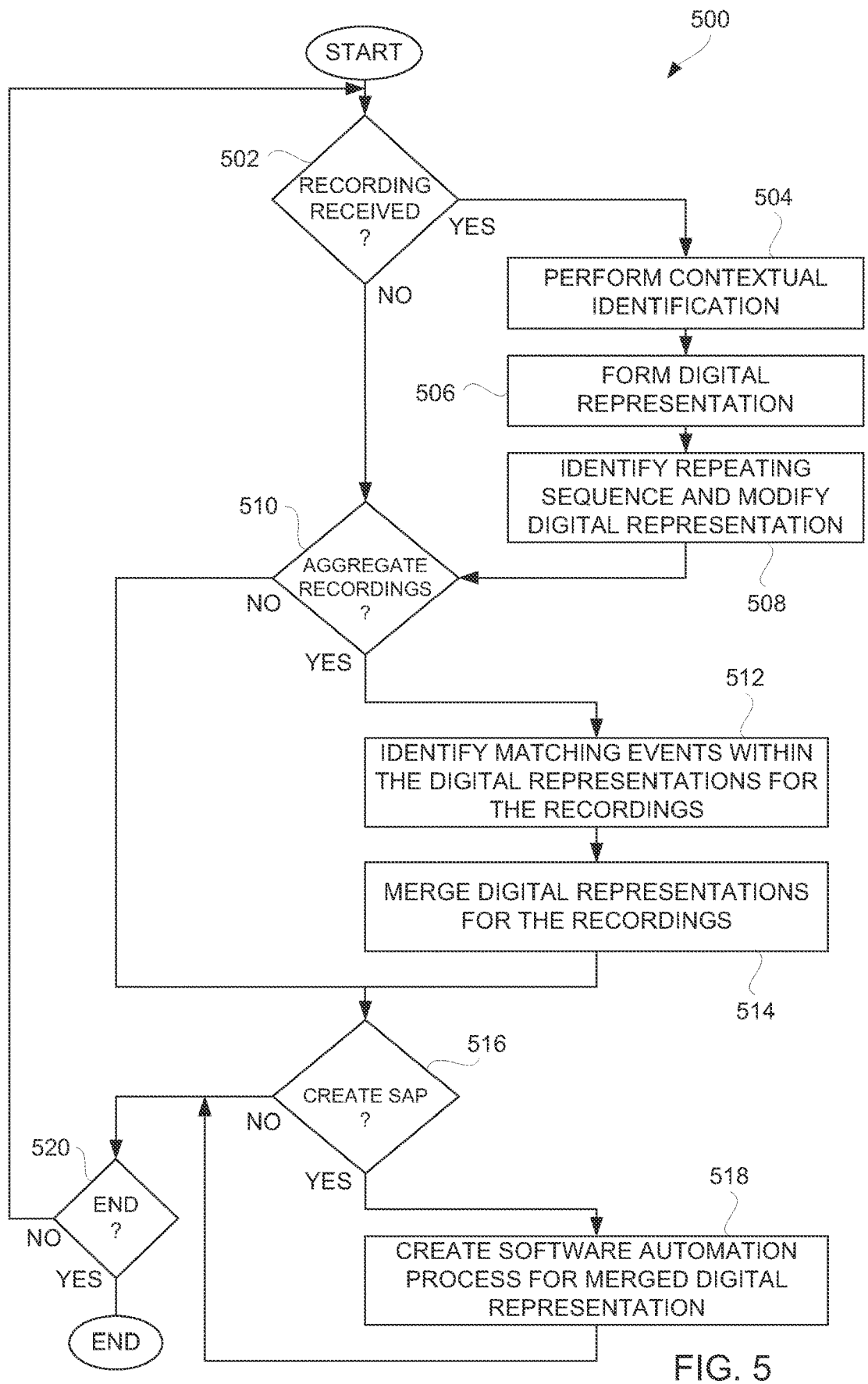
FIG. 5 is a flow diagram of an automation creation process according to one embodiment.

FIG. 5 is a flow diagram of an automation creation process 500 according to one embodiment. The automation creation process 500 can, for example, be performed by the RPA system 102 illustrated in FIG. 1, the RPA system 202 illustrated in FIG. 2, or the RPA system 300 illustrated in FIG. 3, as examples.

The automation creation process 500 can begin with a decision 502 that determines whether a recording has been received. The recording is an electronic file that stores at least a series of user-initiated events that a user has made with one or more software programs that operate on one or more computing devices. When the decision 502 determines that a recording has been received, the recording can be processed into a digital representation that can be transmitted to and stored in a database. In this embodiment, as illustrated in FIG. 5, when the decision 502 determines that a recording has been received, contextual identification can be performed 504 on the recording. Then, a digital representation for the recording can be formed 506. Next, the recording can be processed to identify 508 a repeating sequence, if any, that may be present within the recording, and then modify the digital representation to reflect the repeating sequence.

On the other hand, when the decision 502 determines that a recording has not been received, or following the block 508 if a recording has been received, a decision 510 can determine whether to aggregate previously received recordings. The aggregation of recordings serves to merge (i.e., combined) together two or more recordings that have been previously received and suitably processed, such as by way of blocks 504-508. When the decision 510 determines that recordings are to be aggregated, matching events within the digital representations for the different recordings being aggregated can be identified 512. Here, the matching of events can be done using the contextual identification information that was previously performed 504 for each of the recordings. Then, the digital representations for the recordings can be merged 514.

Alternatively, when the decision 510 determines that previously received recordings are not to be aggregated at this time, or following the block 514 after the aggregation processing, a decision 516 can determine whether a software automation process (SAP) is to be created. When the decision 516 determines that a software automation process is to be created, a software automation process can be created 518 for the merged digital representation.

On the other hand, when the decision 516 determines that a software automation process is not to be created at this time, or following the block 518 after a software automation process has been created, a decision 520 can determine whether the automation creation process 500 should end. When the decision 520 determines that the automation creation process 500 should not end, then the processing by the automation creation process 500 can return to repeat the decision 502 and subsequent blocks so that additional recordings can be received, aggregated, and/or used to create software automation processes. Alternatively, when the decision 520 determines that the automation creation process 500 should end, then the automation creation process 500 can end.

Figure 6:
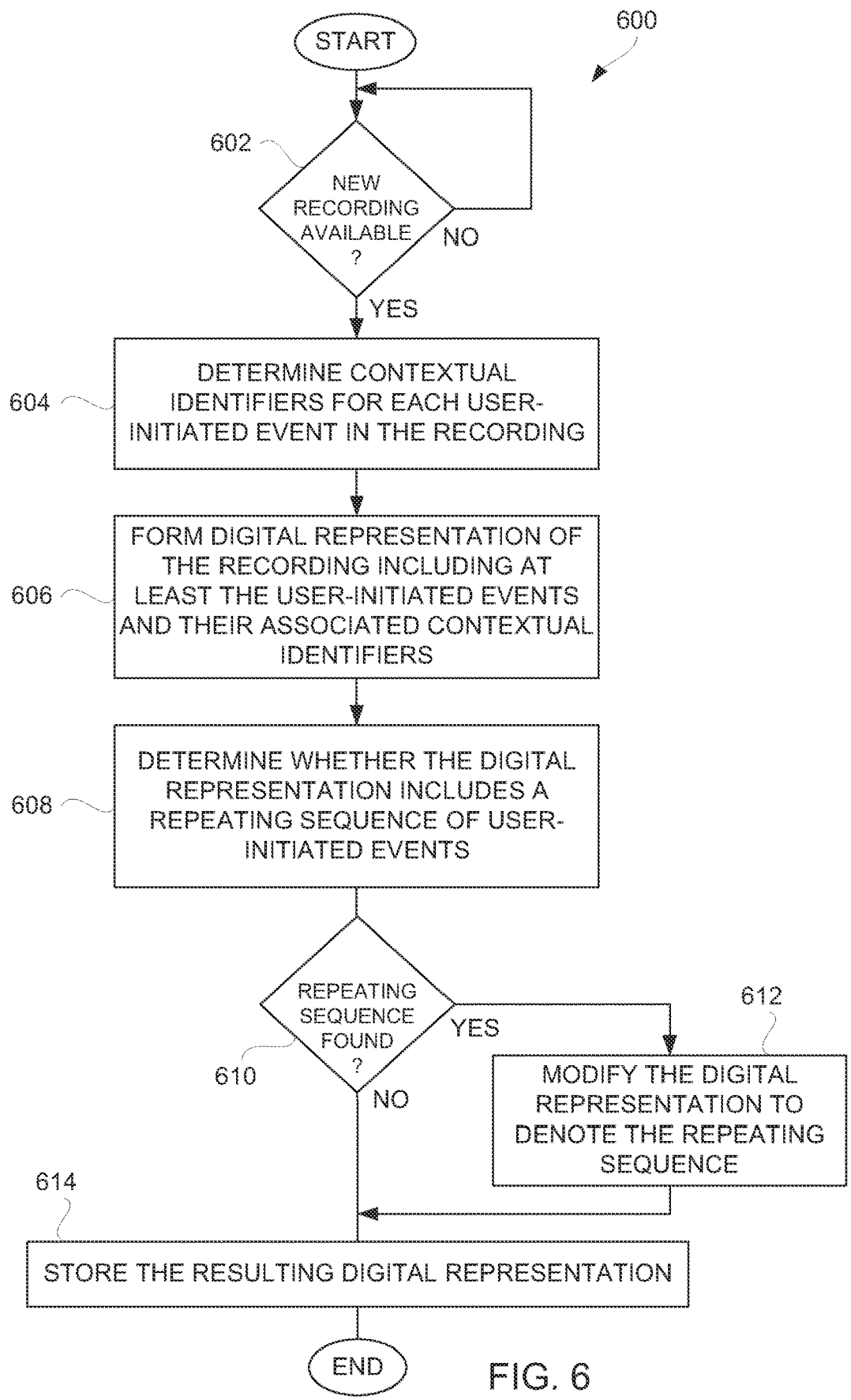
FIG. 6 is a flow diagram of a recording transformation process according to one embodiment.

FIG. 6 is a flow diagram of a recording transformation process 600 according to one embodiment. In general, the recording transformation process 600 can, for example, be performed by the RPA system 102 illustrated in FIG. 1, the RPA system 202 illustrated in FIG. 2, or the RPA system 300 illustrated in FIG. 3, as examples. More particularly, the recording transformation process 600 can be performed by the recording pre-processor 400 illustrated in FIG. 4A.

The recording transformation process 600 can operate on a recording of user-initiated events with respect to one or more software programs to form a digital representation thereof. The digital representation is able to be digitally stored and modified such that multiple recordings can later be combined prior to forming software automation processes.

The recording transformation process 600 can begin with a decision 602 that determines whether a new recording is available. When the decision 602 determines that a new recording is not available the recording transformation process 600 can await receipt of such a recording. On the other hand, when the decision 602 determines that a new recording is available, then the recording transformation process 600 can continue.

When the recording transformation process 600 continues, contextual identifiers for each user-initiated event in the recording can be determined 604. A digital representation of the recording can then be formed 606. The digital representation of the recording can include at least the user-initiated events and their associated contextual identifiers.

Next, the recording transformation process 600 can determine whether the digital representation includes a repeating sequence of user-initiated events. A decision 610 can determine whether a repeating sequence has been found. When the decision 610 determines that a repeating sequence has been found, the digital representation can be modified 612 to denote the repeating sequence. Following block 612, or following the decision 610 when a repeating sequence has not been found, the recording transformation process 600 can store 614 the resulting digital representation, such as in a database or memory. After the resulting digital representation has been stored 614, the recording transformation process 600 can end.

Additional details on transformation of recordings is provided below. After the contextual identifiers for each recording step have been determined, a mapping can correlate a contextual identifier to each recording step. The contextual identifiers in the mapping can be referred to as fingerprints, which can be hash values.

An exemplary mapping can be provided as a table and can be represented in a JSON format as follows:

```
{
    "2-2", "fingerprint-2",
    "1-2", "fingerprint-1",
    "1-5", "fingerprint-2",
    "1-3", "fingerprint-1",
    "2-4", "fingerprint-2",
    "1-4", "fingerprint-3",
    "2-3", "fingerprint-3"
}
```

This exemplary mapping has two recording, denoted as recording "1" and recording "2". Each step is denoted by its recording and its step within the recording, which together can be referred to as a recording-step key. The ordering of the entries in the exemplary mapping is not important in this example.

Next, linear flowcharts can be formed from this table. For the exemplary mapping, two flowcharts can be formed by transforming the mapping into two linear flowcharts, as illustrated below. These resulting linear flowcharts are exemplary and provide a textual outline for the merged recording that is code compatible and presented in JSON format.

Using such, the exemplary table can be transformed into two flowcharts. Examples of two flowcharts are presented below in a JSON notation. Note that the association between recording-step key and its contextual identifier remain in the flowcharts. The contextual identifiers in the flowcharts are referred to as fingerprints, which can be hash values. The "uid" field is randomly generated unique identifier for a given node. The linear flowcharts provide a textual outline for the merged recording that is code compatible. For example, the textual outline for the two linear flowcharts can be presented in JSON format.

Exemplary Flowchart 1:

```
{
    "type": "FLOW_CHART",
    "version": 2,
    "recordings": [
        1
    ],
    "nodes": [
        {
            "uid": "00000000-0000-0000-0000-000000000001",
            "type": "STEP",
            "label": " ",
            "recordingSteps": [
                "1-2"
            ],
            "attributes": {
                "fingerprint": "fingerprint-1"
            }
        },
        {
            "uid": "00000000-0000-0000-0000-000000000002",
            "type": "STEP",
            "label": " ",
            "recordingSteps": [
                "1-3"
            ],
            "attributes": {
                "fingerprint": "fingerprint-1"
            }
        },
        {
            "uid": "00000000-0000-0000-0000-000000000003",
            "type": "STEP",
            "label": " ",
            "recordingSteps": [
                "1-4"
            ],
            "attributes": {
                "fingerprint": "fingerprint-3"
            }
        },
        {
            "uid": "00000000-0000-0000-0000-000000000004",
            "type": "STEP",
            "label": " ",
            "recordingSteps": [
                "1-5"
            ],
            "attributes": {
                "fingerprint": "fingerprint-2"
            }
        }
    ]
}
```

Exemplary Flowchart 2:

```
{
    "type": "FLOW_CHART",
    "version": 2,
    "recordings": [
        2
    ],
    "nodes": [
        {
            "uid": "00000000-0000-0000-0000-000000000005",
            "type": "STEP",
            "label": " ",
            "recordingSteps": [
                "2-2"
            ],
            "attributes": {
                "fingerprint": "fingerprint-2"
            }
```

```
        },
        {
            "uid": "00000000-0000-0000-0000-000000000006",
            "type": "STEP",
            "label": " ",
            "recordingSteps": [
                "2-3"
            ],
            "attributes": {
                "fingerprint": "fingerprint-3"
            }
        },
        {
            "uid": "00000000-0000-0000-0000-000000000007",
            "type": "STEP",
            "label": " ",
            "recordingSteps": [
                "2-4"
            ],
            "attributes": {
                "fingerprint": "fingerprint-2"
            }
        }
    ]
}
```

Additional details on transformation of recordings is provided below. Once the flowcharts for records are available, the flowcharts can be processed to identify repeating sequences of events (i.e., steps). A repeating sequence of steps can be considered a loop. As an example, a sequence of N steps within a single recording that gets executed at least twice without a step in between can be considered a simple loop.

Upon receiving a linear flowchart (i.e., a flowchart no decisions or loops), then the processing can determine whether the flowchart includes a simple loop. The processing can search for a simple loop with at least "s" steps which has "f" distinct contextual identifiers (e.g., fingerprints) and the same sequence is immediately repeated at least "n" times. The detection of a simple loop can be managed with these parameters.

As an example, given an exemplary sequence of <a, b, c, d, e, c, d, e, c, d, e, f>, the processing can cause the exemplary sequence to be transformed into <a, b, [c, d, e], f> if the parameters s=3, f=3 and n=3 are used. As noted above, in one embodiment, the contextual identifiers (e.g., fingerprints) for each step can be based on five fields (application name, action name, action type, class name, and UI criteria name).

FIG. 7A is a flow diagram of an exemplary flowchart 700 of a recording prior to transformation processing. The exemplary flowchart 700 describes a sequence of steps for events or actions from the recording. In this example, the steps are provided in nodes of the exemplary flowchart 700. In particular, the exemplary flowchart 700 includes node A 702, node B 704, node C 706, node D 708, node E 710, and node F 712. Based on comparing contextual identifiers (e.g., fingerprints), nodes B and D are determined to be matching based on their matching fingerprints, and nodes C and E are determined to be matching based on their matching fingerprints.

The exemplary flowchart 700 illustrated in FIG. 7A is a visual representation for the below associated recording. In one implementation, the exemplary flowchart 700 can be represented in a textual outline format that is provided below, which in this example, has a JSON format.

```
{
    "type": "FLOW_CHART",
    "version": 2,
    "recordings": [
        1
    ],
    "nodes": [
        {
            "uid": "00000000-0000-0000-0000-000000000012",
            "type": "STEP",
            "label": "Node A",
            "recordingSteps": [
                "1-1"
            ],
            "attributes": {
                "fingerprint": "fingerprint-1"
            }
        },
        {
            "uid": "00000000-0000-0000-0000-000000000013",
            "type": "STEP",
            "label": "Node B",
            "recordingSteps": [
                "1-2"
            ],
            "attributes": {
                "fingerprint": "fingerprint-2"
            }
        },
        {
            "uid": "00000000-0000-0000-0000-000000000014",
            "type": "STEP",
            "label": "Node C",
            "recordingSteps": [
                "1-3"
            ],
            "attributes": {
                "fingerprint": "fingerprint-3"
            }
        },
        {
            "uid": "00000000-0000-0000-0000-000000000015",
            "type": "STEP",
            "label": "Node D",
            "recordingSteps": [
                "1-4"
            ],
            "attributes": {
                "fingerprint": "fingerprint-2"
            }
        },
        {
            "uid": "00000000-0000-0000-0000-000000000016",
            "type": "STEP",
            "label": "Node E",
            "recordingSteps": [
                "1-5"
            ],
            "attributes": {
                "fingerprint": "fingerprint-3"
            }
        },
        {
            "uid": "00000000-0000-0000-0000-000000000017",
            "type": "STEP",
            "label": "Node F",
            "recordingSteps": [
                "1-6"
            ],
            "attributes": {
                "fingerprint": "fingerprint-7"
            }
        }
    ]
}
```

Note that each node in the textual representation corresponds to a block in the visual representation shown in FIG. 7A. Each node has a unique identifier (uid), a type, a label, an indicator of one or more recording steps, and attribute(s), namely, a fingerprint for the node.

FIG. 7B is a flow diagram of an exemplary flowchart 750 that represents the example flowchart 700 after the transformation processing. The exemplary flowchart 750 includes the same sequence of events or actions as the exemplary flowchart 700, though matching nodes are combined a loop. In this example, nodes B and D are determined to be matching based on their matching fingerprints, and thus can be combined in a first loop 752. Also, in this example, nodes C and E are determined to be matching based on their matching fingerprints, and thus can be combined into a second loop 754. The exemplary flowchart 750 illustrated in FIG. 7B is a visual representation for the below associated recording. In one implementation, the exemplary flowchart 750 can be represented in a textual outline format that is provided below, which in this example has a JSON format.

```
{
    "type": "FLOW_CHART",
    "version": 2,
    "recordings": [
        1
    ],
    "nodes": [
        {
            "uid": "00000000-0000-0000-0000-000000000012",
            "type": "STEP",
            "label": "Node A",
            "recordingSteps": [
                "1-1"
            ],
            "attributes": {
                "fingerprint": "fingerprint-1"
            }
        },
        {
            "uid": "00000000-0000-0000-0000-000000000003",
            "type": "LOOP",
            "loopType": "FOR",
            "label": " ",
            "variable": "Count",
            "value": "2",
            "nodes": [
                {
                    "uid": "00000000-0000-0000-0000-000000000001",
                    "type": "STEP",
                    "label": "Nodes B, D",
                    "recordingSteps": [
                        "1-2",
                        "1-4"
                    ],
                    "attributes": {
                        "fingerprint": "fingerprint-2"
                    }
                },
                {
                    "uid": "00000000-0000-0000-0000-000000000002",
                    "type": "STEP",
                    "label": "Nodes C, E",
                    "recordingSteps": [
                        "1-3",
                        "1-5"
                    ],
                    "attributes": {
                        "fingerprint": "fingerprint-3"
                    }
                }
            ]
        },
        {
            "uid": "00000000-0000-0000-0000-000000000017",
            "type": "STEP",
            "label": "Node F",
            "recordingSteps": [
                "1-6"
            ],
            "attributes": {
                "fingerprint": "fingerprint-7"
            }
        }
    ]
}
```

In some cases, a flowchart of a recording can denote multiple potential repeating sequences (e.g., loops). Hence, in some implementations, there are competing potential repeating sequences. For example, in a flowchart containing a sequence of steps, such as <a, b, c, d, c, d, b, c, d, c, d, e>, where the parameters s=2, f=2 and n=3 are used, then there are two options for loops within the sequence. A first optional loop is <a, [b, c, d, c, d], e>, and a second optional loop is <a, b, [c, d], b, [c, d], e>. In one embodiment, a set of selection rules can be used to select one of the competing potential repeating sequences (i.e., optional loops). For example, the set of selection rules can (i) prefer the potential optional loop that has a greater number of steps in sequence, (ii) next prefer the potential optional loop that has a lower number of repetitions with a higher number of steps in the loop, and (iii) further next prefer the potential optional loop that starts earlier in the flowchart. The set of selection rules allow for a consistent selection of one of the competing potential repeating sequences (i.e., optional loops).

Figure 8:
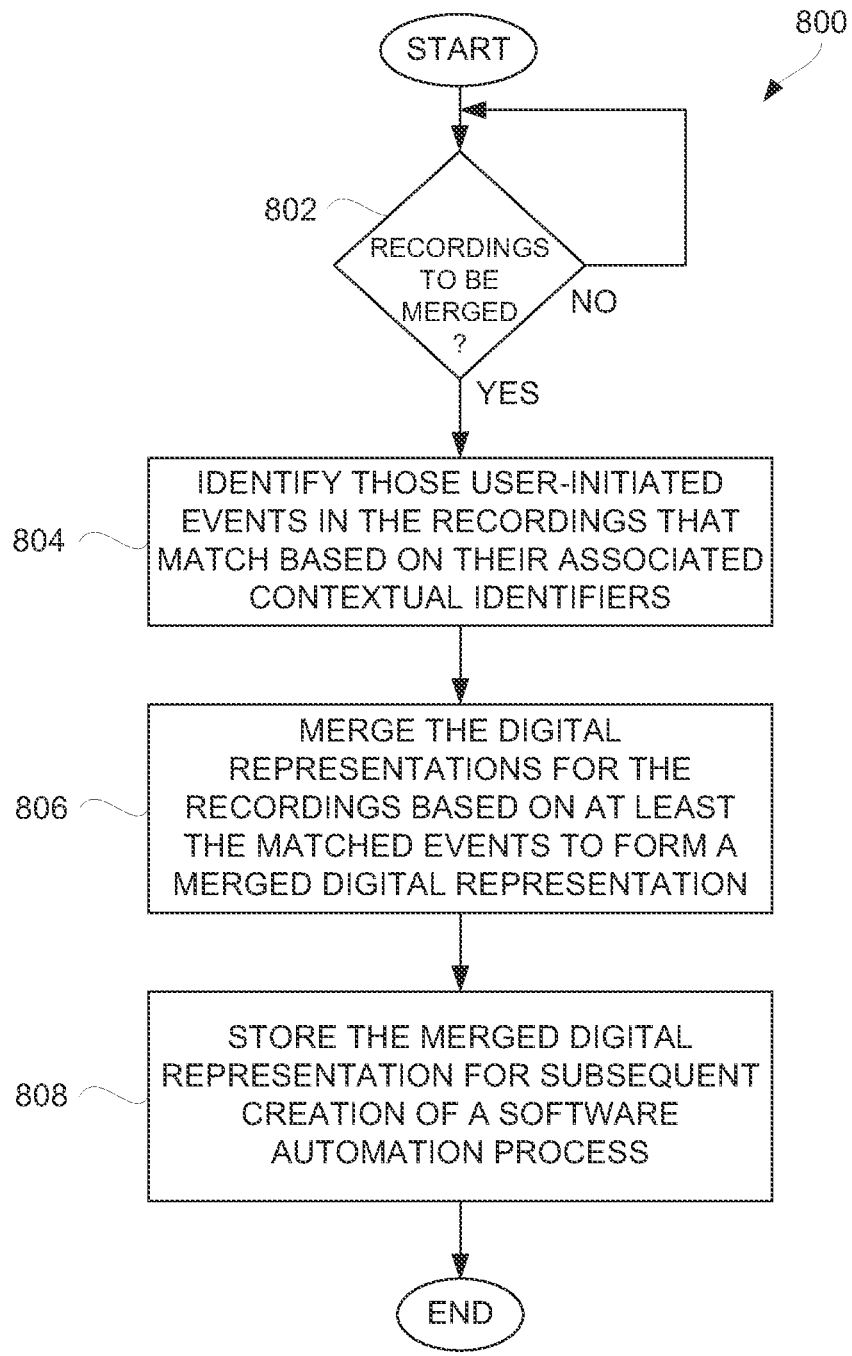
FIG. 8 illustrates a merge process according to one embodiment.

FIG. 8 illustrates a merge process 800 according to one embodiment. In general, the merge process 800 can, for example, be performed by the RPA system 102 illustrated in FIG. 1, the RPA system 202 illustrated in FIG. 2, or the RPA system 300 illustrated in FIG. 3, as examples. More particularly, the merge process 800 can be performed by the aggregator 450 illustrated in FIG. 4B.

The merge process 800 can begin with a decision 802 that can determine whether recordings are to be merged. When the decision 802 determines that recordings are not to be merged at this time, the merge process 800 can wait until recordings are to be merged.

Alternatively, when the decision 802 determines that recordings are to be merged, the merge process 800 can perform several operations. In particular, when one or more recordings are to be merged, the merge process 800 can identify 804 user-initiated events in the recordings that match based on their associated contextual identifiers. The recordings, as previously noted, can be represented in digital representations, which can be a textural outline format, such as a flowchart format. In this regard, each recording has associated contextual identifiers. By comparing the associated contextual identifiers of one recording with the associated contextual identifiers of another recording, matching events can be identified. In one implementation, the associated contextual identifiers can be hashed together to yield a hash value, and then evaluation for matching events can be efficiently determined by comparing respective hash values.

Next, the digital representations for the recordings can be merged 806 based on at least the matched events to form a merged digital representation. Thereafter, the merged digital representation can be stored 808 for subsequent creation of a software automation process. After the merged digital representation has been stored 808 (e.g. in a database or memory), the merge process 800 can end.

In one embodiment, the digital representations can be flowcharts. The merging of recordings can be implemented by merging flowcharts of the recordings. The merging of two or more flowcharts creates a merged flowchart. When merging flowcharts, branches can be formed. In one embodiment, the merged flowchart maintains the order of the steps from the individual flowcharts that have been merged. Every step from the original recordings is presented not more than once in the resulting merged flowchart. Equal steps across the branches on the given "level" can either include the steps from all the input flowcharts being merged or they can be kept separately if they did not merge and a branch (variance) can be created.

In one embodiment, an order by which various flowcharts are merged can be done in accordance with one or more rules. These rules can yield consistent merged results when the merge process is order dependent. In general, when merging multiple flowcharts, the longest flowchart (i.e., having more steps) can be used first. If the flowcharts are of the same length, then the flowchart pertaining to a recording can be chosen based on another criteria, such as lower recording number first. For example, the two longest flowcharts are first used to make a first intermediate flowchart. Then, then the next longest remaining flowchart can be merged with the first intermediate flowchart. After all the flowcharts have been merged, the resulting flowchart is a final aggregated flowchart.

After the first two flowcharts are merged, then the merge process can determine whether to merge another flowchart into a new branch or an existing branch of the merged intermediate flowchart. In one embodiment, the merge process can use three parameters to manage the merge process.

A first parameter can pertain a maximum allowed local difference in the time axis for merge, which is referred to as DT. This provides a sliding window to limit combining of matching steps to those steps within the sliding window. For example, where the time axis is represented from time 0 to time 1, if DT is 0.2, a step at time axis 0.3 can be combined if the other step to be combined is +/−0.2 from the current step at time axis 0.3. For example, if node 5 of recording A is at its time axis of 0.3 matches via their fingerprints with node 16 of recording B is at its time axis of 0.9. In this example, the parameter DT would not be satisfied since 0.9 is greater than 0.3+0.2.

A second parameter, denoted as M, can pertain to a minimum number of consecutive matching steps, e.g., via fingerprints. For example, if M=2, then, in order for steps from different flowcharts to be merged into a branch (existing branch or new branch), two or more consecutive steps from the different flowcharts need to match.

A third parameter, denoted as B, can pertain to a minimal percentage (%) of steps that match with an existing branch for the other flowchart to be merged into that branch. If the minimum percentage (%) is not met, then the other flowchart is merged as a new branch in the aggregated flowchart. For example, if B=0.5, then the other recording is merged into an existing branch only if at least 50% of the steps in the other recording and the existing branch match.

The aggregation of recordings by merging flowcharts can have multiple paths. In one embodiment, to decide amongst multiple paths during merging flowcharts, the merge process can choose the path that merges a higher number of consecutive steps. In general, it is desired to maximize the amount of merging so that the number of steps in the merged flowchart can be minimized. Also, in one implementation, loops within flowcharts can take precedence over branches, such that steps that represent loops are not merged into one branch. Further, in one implementation, if there are nested IF operations, the nesting can be merged making one branch.

Figures 9A, 9B:
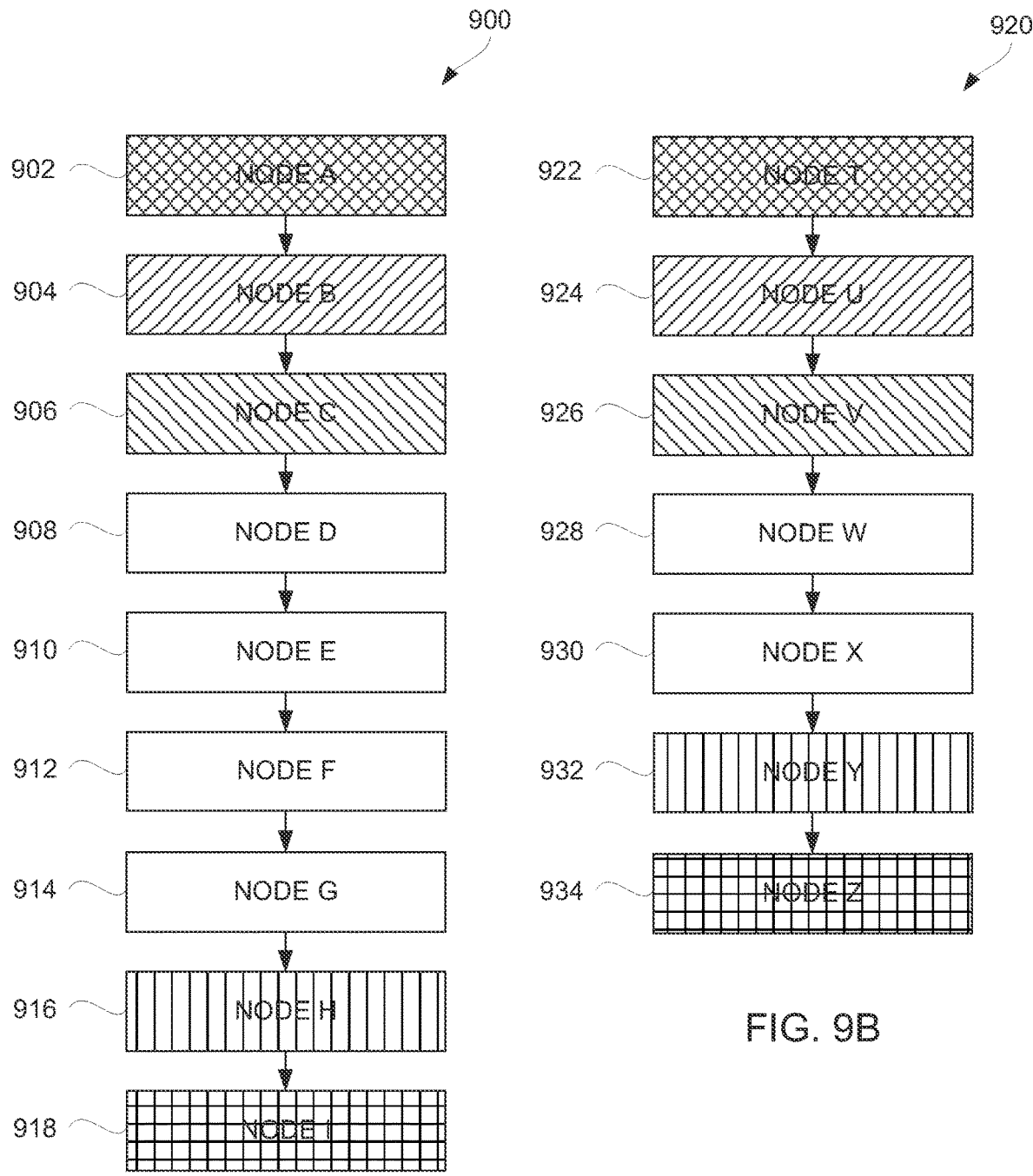
FIG. 9A is a flow diagram of a first exemplary flowchart of a recording prior to merge processing.
FIG. 9B is a flow diagram of a second exemplary flowchart of a recording prior to merge processing.

FIG. 9A is a flow diagram of a first exemplary flowchart 900 of a recording prior to the merge processing. The exemplary flowchart 900 describes a sequence of steps for events or actions from the recording. In this example, the steps are provided in nodes of the exemplary flowchart 900. In particular, the exemplary flowchart 900 includes node A 902, node B 904, node C 906, node D 908, node E 910, node F 912, node G 914, node H 916, and node I 918. In this example, each of nodes A-I are distinct nodes and thus do not have matching fingerprints. The exemplary flowchart 900 illustrated in FIG. 9A is a visual representation for the below example associated recording. In one implementation, the exemplary flowchart 900 can be represented in a textual outline format as provided below, which, in this example, has a JSON format.

```
{
  "type": "FLOW_CHART",
  "version": 2,
  "recordings": [
    1
  ],
  "nodes": [
    {
      "uid": "00000000-0000-0000-0000-a00000000001",
      "type": "STEP",
      "label": "Node A",
      "recordingSteps": [
        "1-1"
      ],
      "attributes": {
        "fingerprint": "fingerprint-1"
      }
    },
    {
      "uid": "00000000-0000-0000-0000-a00000000002",
      "type": "STEP",
      "label": "Node B",
      "recordingSteps": [
        "1-2"
      ],
      "attributes": {
        "fingerprint": "fingerprint-2"
      }
    },
    {
      "uid": "00000000-0000-0000-0000-a00000000003",
      "type": "STEP",
      "label": "Node C",
      "recordingSteps": [
        "1-3"
      ],
      "attributes": {
        "fingerprint": "fingerprint-3"
      }
    },
    {
      "uid": "00000000-0000-0000-0000-a00000000004",
      "type": "STEP",
      "label": "Node D",
      "recordingSteps": [
        "1-4"
      ],
      "attributes": {
        "fingerprint": "fingerprint-a"
      }
    },
    {
      "uid": "00000000-0000-0000-0000-a00000000005",
      "type": "STEP",
      "label": "Node E",
      "recordingSteps": [
        "1-5"
      ],
      "attributes": {
        "fingerprint": "fingerprint-b"
      }
    }
```

```
        },
        {
            "uid": "00000000-0000-0000-0000-a00000000006",
            "type": "STEP",
            "label": "Node F",
            "recordingSteps": [
                "1-6"
            ],
            "attributes": {
                "fingerprint": "fingerprint-c"
            }
        },
        {
            "uid": "00000000-0000-0000-0000-a00000000007",
            "type": "STEP",
            "label": "Node G",
            "recordingSteps": [
                "1-7"
            ],
            "attributes": {
                "fingerprint": "fingerprint-d"
            }
        },
        {
            "uid": "00000000-0000-0000-0000-a00000000008",
            "type": "STEP",
            "label": "Node H",
            "recordingSteps": [
                "1-8"
            ],
            "attributes": {
                "fingerprint": "fingerprint-e"
            }
        },
        {
            "uid": "00000000-0000-0000-0000-a00000000009",
            "type": "STEP",
            "label": "Node I",
            "recordingSteps": [
                "1-9"
            ],
            "attributes": {
                "fingerprint": "fingerprint-f"
            }
        }
    ]
}
```

FIG. 9B is a flow diagram of a second exemplary flowchart 920 of a recording prior to the merge processing. The exemplary flowchart 920 describes a sequence of steps for events or actions from the recording. In this example, the steps are provided as nodes of the exemplary flowchart 920. In particular, the exemplary flowchart 920 includes node T 922, node U 924, node V 926, node W 928, node X 930, node Y 932, and node Z 934. In this example, each of the nodes T-Z are distinct nodes and thus do not have matching fingerprints. The exemplary flowchart 920 illustrated in FIG. 9B is a visual representation for the associated recording. In one implementation, the exemplary flowchart 920 can be represented in a textual outline format that is provided below, which, in this example, has a JSON format.

```
{
    "type": "FLOW_CHART",
    "version": 2,
    "recordings": [
        2
    ],
    "nodes": [
        {
            "uid": "00000000-0000-0000-0000-b00000000001",
            "type": "STEP",
            "label": "Node T",
            "recordingSteps": [
                "2-1"
            ],
            "attributes": {
                "fingerprint": "fingerprint-1"
            }
        },
        {
            "uid": "00000000-0000-0000-0000-b00000000002",
            "type": "STEP",
            "label": "Node U",
            "recordingSteps": [
                "2-2"
            ],
            "attributes": {
                "fingerprint": "fingerprint-2"
            }
        },
        {
            "uid": "00000000-0000-0000-0000-b00000000003",
            "type": "STEP",
            "label": "Node V",
            "recordingSteps": [
                "2-3"
            ],
            "attributes": {
                "fingerprint": "fingerprint-3"
            }
        },
        {
            "uid": "00000000-0000-0000-0000-b00000000004",
            "type": "STEP",
            "label": "Node W",
            "recordingSteps": [
                "2-4"
            ],
            "attributes": {
                "fingerprint": "fingerprint-x"
            }
        },
        {
            "uid": "00000000-0000-0000-0000-b00000000005",
            "type": "STEP",
            "label": "Node X",
            "recordingSteps": [
                "2-5"
            ],
            "attributes": {
                "fingerprint": "fingerprint-y"
            }
        },
        {
            "uid": "00000000-0000-0000-0000-b00000000006",
            "type": "STEP",
            "label": "Node Y",
            "recordingSteps": [
                "2-6"
            ],
            "attributes": {
                "fingerprint": "fingerprint-e"
            }
        },
        {
            "uid": "00000000-0000-0000-0000-b00000000007",
            "type": "STEP",
            "label": "Node Z",
            "recordingSteps": [
                "2-7"
            ],
            "attributes": {
                "fingerprint": "fingerprint-f"
            }
        }
    ]
}
```

Figure 9C:
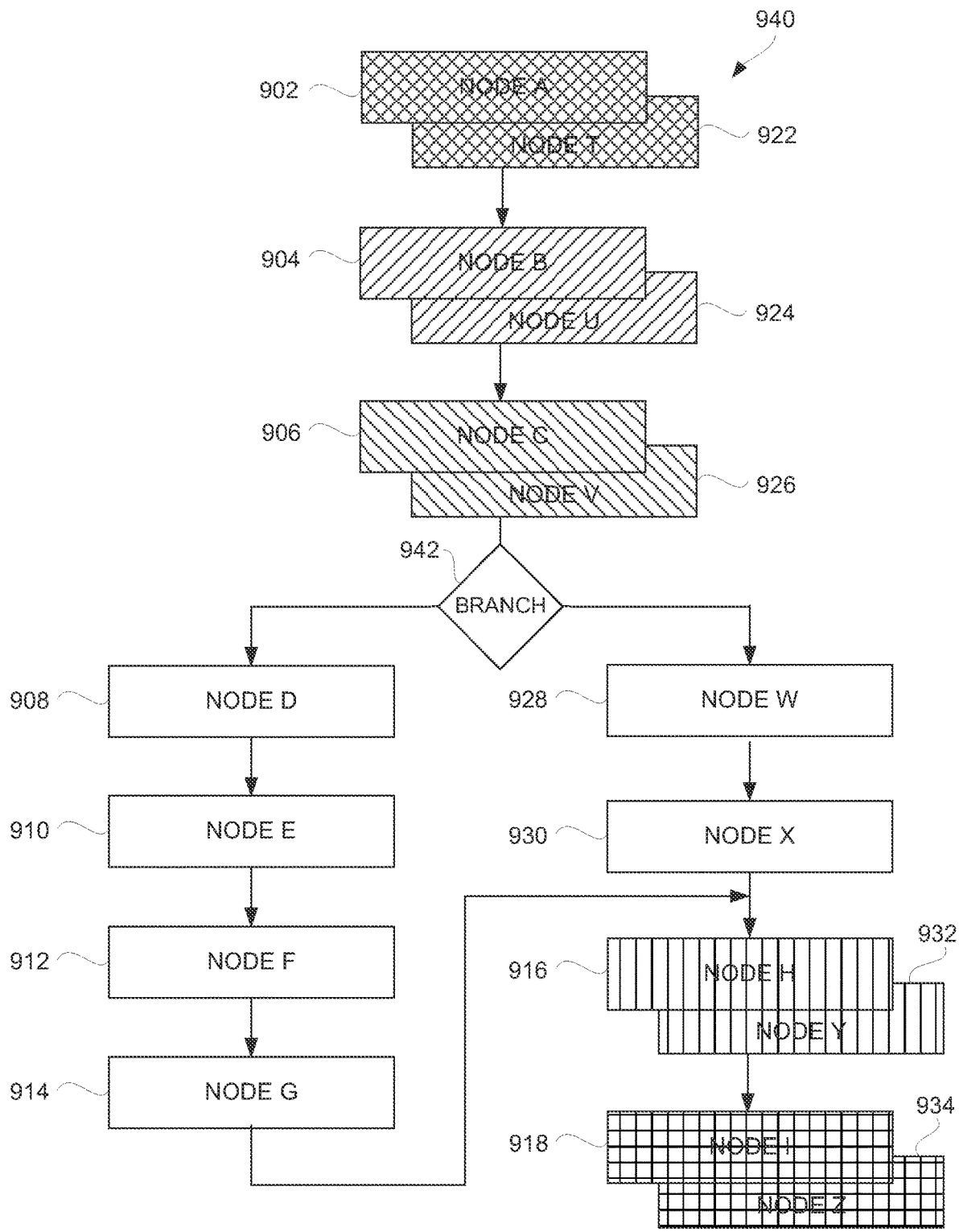
FIG. 9C is a flow diagram of an exemplary flowchart for a merged recording that results from the combination of the first exemplary flowchart and the second exemplary flowchart by merge processing.

FIG. 9C is a flow diagram of an exemplary flowchart 940 for a merged recording that results from the combination of the first exemplary flowchart 900 illustrated in FIG. 9A and the second exemplary flowchart 920 illustrated in FIG. 9B by the merge process. The third exemplary flowchart 940 includes the combination of the various sequence of events or actions from the first exemplary flowchart 900 and the second exemplary flowchart 920, though a branch is formed and matching nodes are combined in loops.

In this example shown in FIG. 9C, nodes A, B and C of the first exemplary flowchart 900 are determined to match node T, U and V of the second exemplary flowchart 920 based on their matching fingerprints, and can thus be respectively combined in loops. In addition, a branch 942 is provided in the exemplary flowchart 940 to transition between different processing branches. Further, at the end of the exemplary flowchart 940 nodes H and I of the first exemplary flowchart 900 are determined to match node Y and Z of the second exemplary flowchart 920 based on their matching fingerprints, and can thus be respectively combined in loops. Nodes D, E, F, and G of the first exemplary flowchart 920 are determined not to match with any of the nodes in the second exemplary flowchart 920. The exemplary flowchart 940 illustrated in FIG. 9C is a digital representation for the associated merged recording associated with the first exemplary flowchart 900 and the second exemplary flowchart 920. In one implementation, the exemplary flowchart 940 can be represented in a textual outline format that is provided below, which, in this example, has a JSON format.

```
{
    "type": "FLOW_CHART",
    "version": 2,
    "recordings": [
        1,
        2
    ],
    "nodes": [
        {
            "uid": "00000000-0000-0000-0000-000000000001",
            "type": "STEP",
            "label": "Nodes A & T",
            "recordingSteps": [
                "1-1",
                "2-1"
            ],
            "attributes": {
                "fingerprint": "fingerprint-1"
            }
        },
        {
            "uid": "00000000-0000-0000-0000-000000000002",
            "type": "STEP",
            "label": "Nodes B & U",
            "recordingSteps": [
                "1-2",
                "2-2"
            ],
            "attributes": {
                "fingerprint": "fingerprint-2"
            }
        },
        {
            "uid": "00000000-0000-0000-0000-000000000003",
            "type": "STEP",
            "label": "Nodes C and V",
            "recordingSteps": [
                "1-3",
                "2-3"
            ],
            "attributes": {
                "fingerprint": "fingerprint-3"
            }
        },
        {
            "uid": "00000000-0000-0000-0000-000000000004",
```

-continued

```
            "type": "IF",
            "label": " ",
            "variable": " ",
            "branches": [
                {
                    "uid": "00000000-0000-0000-0000-000000000005",
                    "label": " ",
                    "condition": " ",
                    "nodes": [
                        {
                            "uid": "00000000-0000-0000-0000-a00000000004",
                            "type": "STEP",
                            "label": "Node D",
                            "recordingSteps": [
                                "1-4"
                            ],
                            "attributes": {
                                "fingerprint": "fingerprint-a"
                            }
                        },
                        {
                            "uid": "00000000-0000-0000-0000-a00000000005",
                            "type": "STEP",
                            "label": "Node E",
                            "recordingSteps": [
                                "1-5"
                            ],
                            "attributes": {
                                "fingerprint": "fingerprint-b"
                            }
                        },
                        {
                            "uid": "00000000-0000-0000-0000-a00000000006",
                            "type": "STEP",
                            "label": "Node F",
                            "recordingSteps": [
                                "1-6"
                            ],
                            "attributes": {
                                "fingerprint": "fingerprint-c"
                            }
                        },
                        {
                            "uid": "00000000-0000-0000-0000-a00000000007",
                            "type": "STEP",
                            "label": "Node G",
                            "recordingSteps": [
                                "1-7"
                            ],
                            "attributes": {
                                "fingerprint": "fingerprint-d"
                            }
                        }
                    ]
                },
                {
                    "uid": "00000000-0000-0000-0000-000000000006",
                    "label": " ",
                    "condition": " ",
                    "nodes": [
                        {
                            "uid": "00000000-0000-0000-0000-b00000000004",
                            "type": "STEP",
                            "label": "Node W",
                            "recordingSteps": [
                                "2-4"
                            ],
                            "attributes": {
                                "fingerprint": "fingerprint-x"
                            }
                        },
                        {
```

-continued

```
        "uid": "00000000-0000-0000-0000-
b00000000005",
        "type": "STEP",
        "label": "Node X",
        "recordingSteps": [
            "2-5"
        ],
        "attributes": {
            "fingerprint": "fingerprint-y"
        }
    }
   ]
  }
 ]
},
{
    "uid": "00000000-0000-0000-0000-000000000007",
    "type": "STEP",
    "label": "Nodes H & Y",
    "recordingSteps": [
        "1-8",
        "2-6"
    ],
    "attributes": {
        "fingerprint": "fingerprint-e"
    }
},
{
    "uid": "00000000-0000-0000-0000-000000000008",
    "type": "STEP",
    "label": "Nodes I & Z",
    "recordingSteps": [
        "1-9",
        "2-7"
    ],
    "attributes": {
        "fingerprint": "fingerprint-f"
    }
 }
]
}
```

Figure 10:
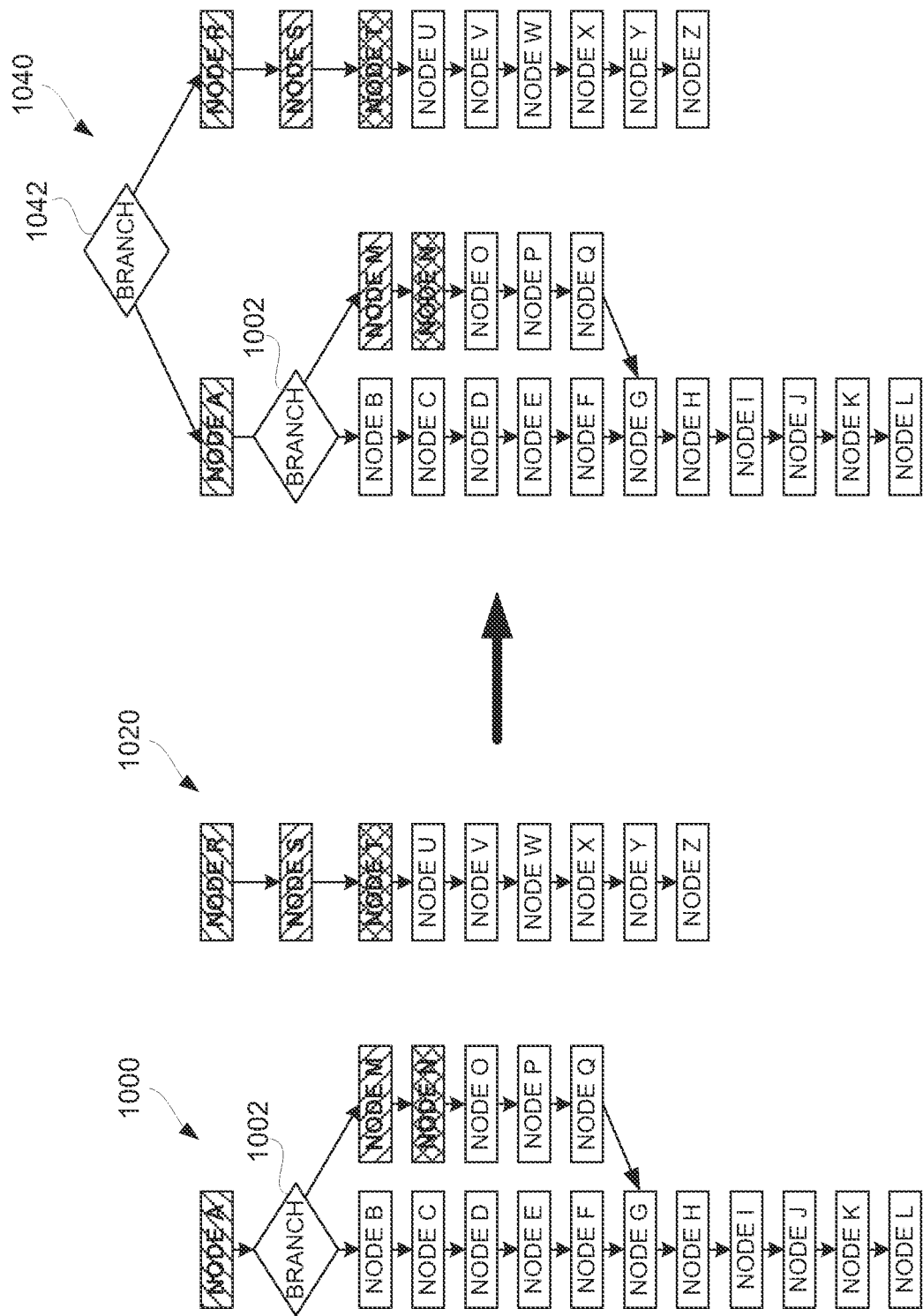
FIG. 10 is a flow diagram of an exemplary merge process according to one embodiment.
Figure 11:
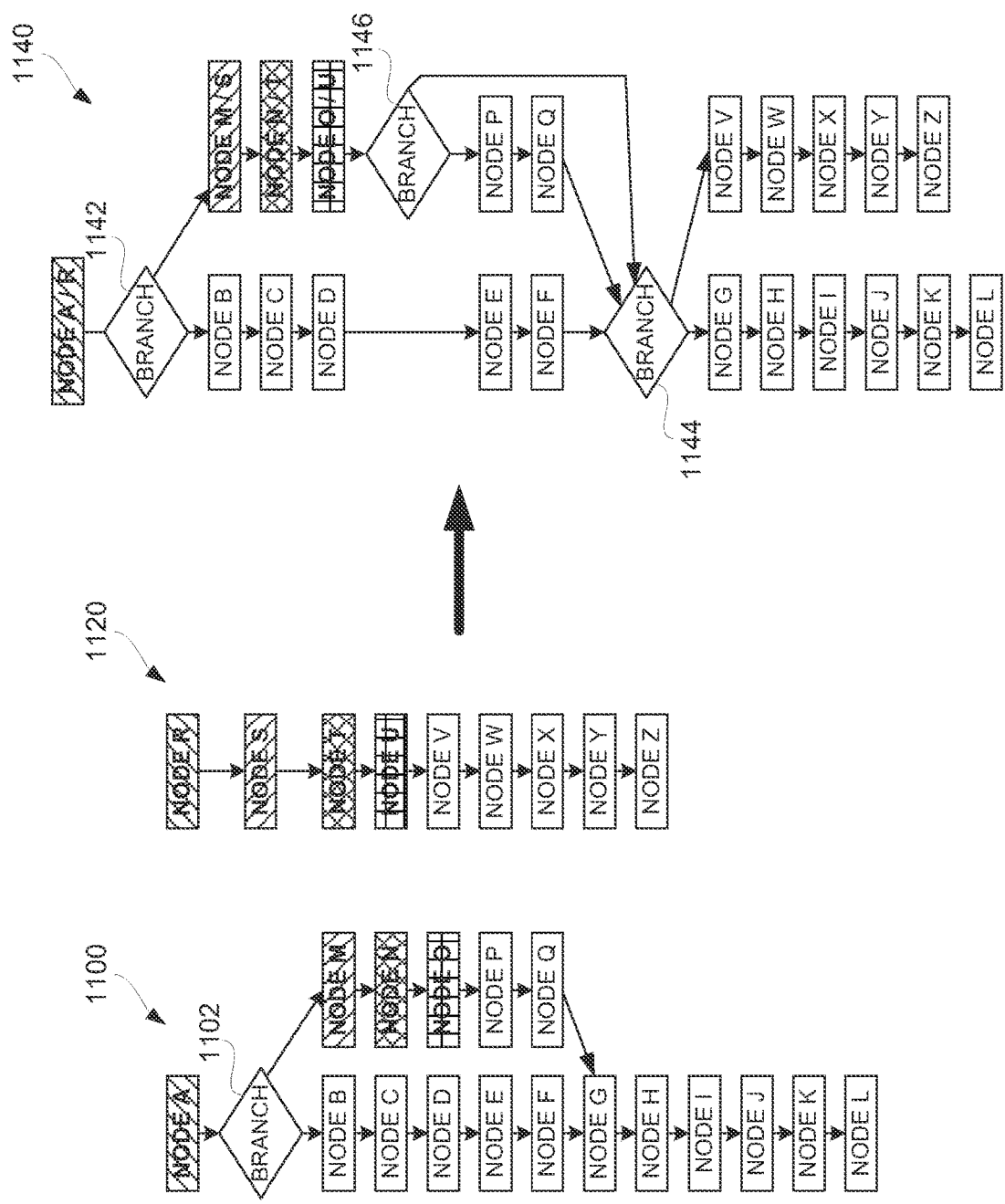
FIG. 11 is a flow diagram of an exemplary merge process according to another embodiment.
Figure 12:
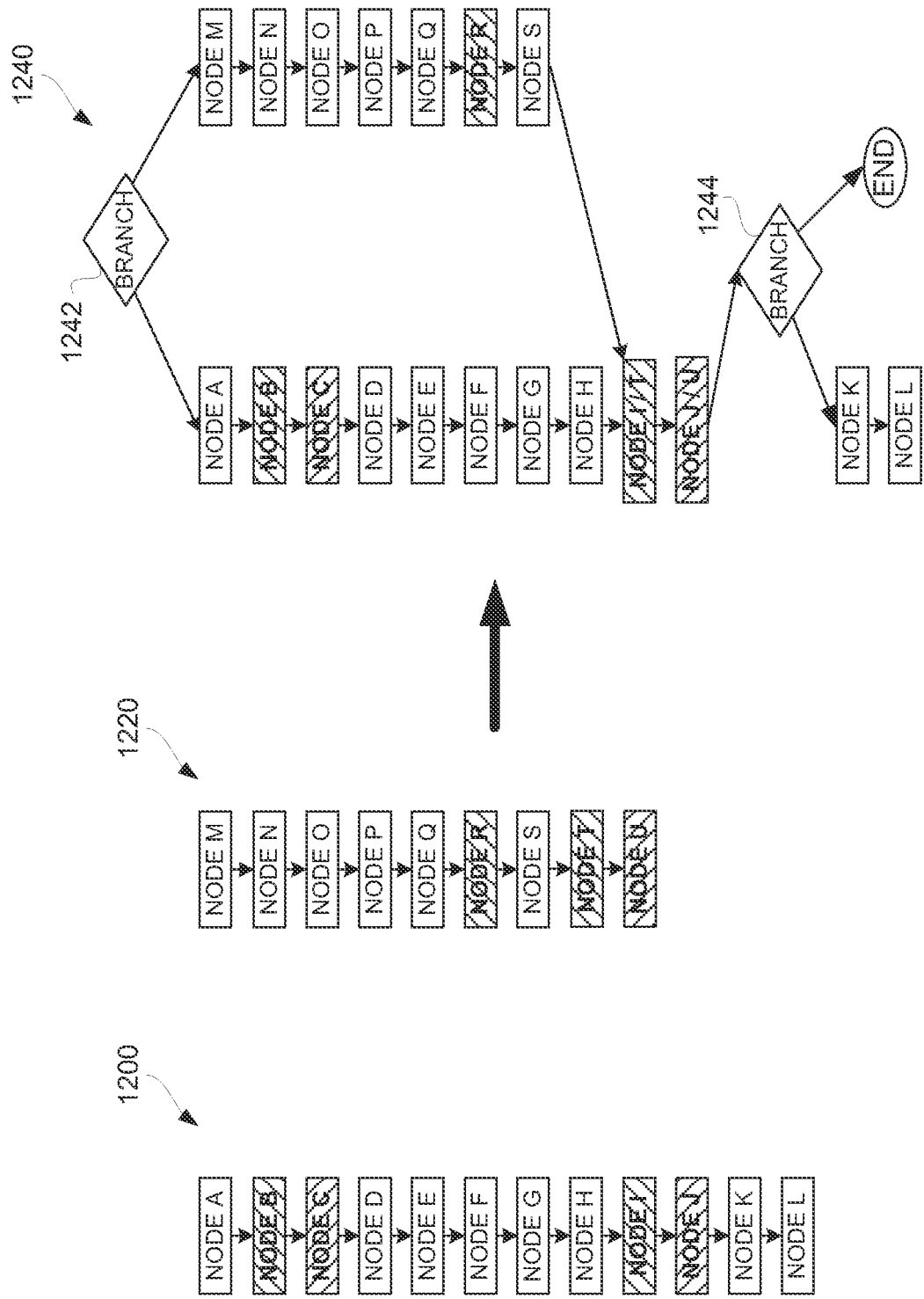
FIG. 12 is a flow diagram of an exemplary merge process according to still another embodiment.

FIGS. 10-12 depict some additional illustrations that examine other merge processing examples. These additional illustrations are exemplary and not intended to be limiting, as merge processing can proceed by other criteria or rules in other embodiments.

FIG. 10 is a flow diagram of an exemplary merge process according to one embodiment. The exemplary merge process involves a first exemplary flowchart 1000, a second exemplary flowchart 1020, and a merged exemplary flowchart 1040. The exemplary merge process serves to receive the first exemplary flowchart 1000 and the second exemplary flowchart 1020 as inputs, and decides how to merge them to form the merged exemplary flowchart 1040. In this embodiment, the merge process uses the above-noted three parameters DT, M and B to manage the merge process.

The first exemplary flowchart 1000 describes a sequence of steps for events or actions from a first recording. In this example, the steps are provided in nodes of the first exemplary flowchart 1000. In particular, the exemplary flowchart 1000 includes nodes A-Q, and a branch point 1002. The branch point 1002 forms a left branch having nodes B-L, and a right branch having nodes M-Q. Each of the nodes has a corresponding fingerprint. In this example, nodes A, M and N have specific distinct fingerprints of interest in the merge processing, and the remaining nodes are considered distinct nodes with distinct fingerprints.

The second exemplary flowchart 1020 describes a sequence of steps for events or actions from a second recording. In this example, the steps are provided in nodes of the second exemplary flowchart 1020. In particular, the exemplary flowchart 1020 includes nodes R-Z. Each of the nodes has a corresponding fingerprint. In this example, nodes R, S and T have specific distinct fingerprints of interest in the merge processing, and the remaining nodes are considered distinct nodes with distinct fingerprints.

During the merge process, it is recognized that, due to matching fingerprints: (i) nodes A and R match, (ii) nodes M and S match, and (iii) nodes N and T match. Assume that the parameter M is 2 and the parameter B is 0.5 [i.e., 50% match]. Comparing the secondary exemplary flowchart 1020 to the right branch of the first exemplary flowchart 1000, it can be seen that there is a sequence of two matching nodes. This satisfies the parameter M being at least 2. The parameter DT ensures proximity of the nodes across different flowcharts and, in this example, is presumed to be satisfied. However, the parameter B requires that the nodes within the secondary exemplary flowchart 1020 match (sequentially) at least 50% of the nodes in the right branch of the first exemplary flowchart 1000. However, in this example, only two nodes, nodes M and N, are matched with nodes S and T of the secondary exemplary flowchart 1020. Hence, 2 of 5 nodes match, which is only 40% match, and thus cannot satisfy parameter B. Consequently, the merge process produces the merged exemplary flowchart 1040 in which the secondary exemplary flowchart 1020 is not merged into an existing branch of the first exemplary flowchart 1000 but is instead merged in as a new branch. The merged exemplary flowchart 1040 include a branch point 1042 that forms a left branch and a right branch. The left branch includes the first exemplary flowchart 1000. The right branch includes the second exemplary flowchart 1020. In this example, although nodes A, M and N from the first exemplary flowchart 1020 respectively match the nodes R, S and T from the second exemplary flowchart 1020, such nodes remain in distinct branches and are not combined.

FIG. 11 is a flow diagram of an exemplary merge process according to another embodiment. The exemplary merge process involves a first exemplary flowchart 1100, a second exemplary flowchart 1120, and a merged exemplary flowchart 1140. The exemplary merge process serves to receive the first exemplary flowchart 1100 and the second exemplary flowchart 1120 as inputs, and decides how to merge them to form the merged exemplary flowchart 1140. In this embodiment, the merge process also uses the above-noted three parameters DT, M and B to manage the merge process.

The first exemplary flowchart 1100 describes a sequence of steps for events or actions from a first recording. In this example, the steps are provided in nodes of the first exemplary flowchart 1100. In particular, the exemplary flowchart 1100 includes nodes A-Q, and a branch point 1102. The branch point 1102 forms a left branch having nodes B-L, and a right branch having nodes M-Q. Each of the nodes has a corresponding fingerprint. In this example, nodes A, M, N and O have specific distinct fingerprints of interest in the merge process, and the remaining nodes are considered distinct nodes with distinct fingerprints.

The second exemplary flowchart 1020 describes a sequence of steps for events or actions from a second recording. In particular, the exemplary flowchart 1120 includes nodes R-Z. Each of the nodes has a corresponding fingerprint. In this example, nodes R, S, T and U have specific distinct fingerprints of interest in the merge process, and the remaining nodes are considered distinct nodes with distinct fingerprints.

During the merge process, it is recognized that, due to matching fingerprints: (i) nodes A and R match, (ii) nodes M and S match, (iii) nodes N and T match, and (iv) nodes O and U match. The nodes A and R match and are outside of branches and can be merged, and is shown as node A/R in the merged exemplary flowchart 1140.

Assume that the parameter M is 2 and the parameter B is 0.5 [i.e., 50% match]. Comparing the secondary exemplary flowchart 1120 to the right branch of the first exemplary flowchart 1100, it can be seen that there is a sequence of three matching nodes. This satisfies the parameter M being at least 2. The parameter DT ensures proximity of the nodes across different flowcharts and, in this example, is presumed to be satisfied. However, parameter B requires that the nodes within the secondary exemplary flowchart 1120 match (sequentially) to at least 50% of the nodes in the right branch of the first exemplary flowchart 1100. However, in this example, three nodes, nodes M, N and O, are matched with nodes S, T and U of the secondary exemplary flowchart 1120. Hence, 3 of 5 nodes match, which is a 60% match. Thus, parameter B is satisfied. Consequently, the merge process produces the merged exemplary flowchart 1140 in which the secondary exemplary flowchart 1120 is merged into the right branch from the branch point 1142.

The merged exemplary flowchart 1140 includes a branch point 1142 that forms a left branch and a right branch. The left branch includes the first exemplary flowchart 1100 along with a branch point 1144. The right branch includes the second exemplary flowchart 1120 along with a branch point 1146. In doing so, the matching nodes between the first exemplary flowchart 1100 and the second exemplary flowchart 1120 are combined. Hence, the right branch includes matched nodes, node M/S, node N/T, and node O/U. Additionally, branch point 1146 provides additional branching. The additional left branch includes nodes P and Q and then proceeds to branch point 1144. The additional right branch also proceeds directly to branch point 1144. The branch point 1144 forms a left branch and a right branch. The left branch includes nodes G-L from the first exemplary flowchart 1100. The right branch includes nodes V-Z from the second exemplary flowchart 1120.

FIG. 12 is a flow diagram of an exemplary merge process according to still another embodiment. The exemplary merge process involves a first exemplary flowchart 1200, a second exemplary flowchart 1220, and a merged exemplary flowchart 1240. The exemplary merge process serves to receive the first exemplary flowchart 1200 and the second exemplary flowchart 1220 as inputs, and decides how to merge them to form the merged exemplary flowchart 1240. In this embodiment, the merge process uses the above-noted three parameters DT, M and B to manage the merge process.

The first exemplary flowchart 1200 describes a sequence of steps for events or actions from a first recording. In this example, the steps are provided in nodes of the first exemplary flowchart 1200. In particular, the exemplary flowchart 1200 includes nodes A-L. Each of the nodes has a corresponding fingerprint. In this example, nodes B, C, I and J have specific distinct fingerprints of interest in the merge process, and the remaining nodes are considered distinct nodes with distinct fingerprints.

The second exemplary flowchart 1220 describes a sequence of steps for events or actions from a second recording. In this example, the steps are provided in nodes of the second exemplary flowchart 1220. In particular, the exemplary flowchart 1220 includes nodes M-U. Each of the nodes has a corresponding fingerprint. In this example, nodes R, T and U have specific distinct fingerprints of interest in the merge process, and the remaining nodes are considered distinct nodes with distinct fingerprints.

During the merge process, it is recognized that, due to matching fingerprints: (i) nodes B, I, R, and T match, and (ii) nodes C, J, and U match. Assume that the parameter M is 2, the parameter B is 0.5 [i.e., 50% match] and the parameter DT is 0.2 [i.e., 30%]. Comparing the first exemplary flowchart 1200 with the secondary exemplary flowchart 1220, it can be seen that there is a sequence of two matching nodes. Actually, there are two sequences in the first exemplary flowchart 1200, namely, nodes B-C and nodes I-J, that can be respectively matched with nodes T-U in the second exemplary flowchart 1220. These sequences each have a length of two nodes so they satisfy the parameter M being at least 2. The parameter B is not relevant since neither of the first exemplary flowchart 1200 or the second exemplary flowchart 1220 have any branches.

The parameter DT, however, imposes a proximity limitation. Here, nodes B and C are a sequence of nodes in the first exemplary flowchart 1200 that match with the sequence of nodes T and U, respectively, in the second exemplary flowchart 1220. However, such nodes are not merged because the parameter DT renders the sequences too far from one another. For example, this particular sequence starts at sequential node 2 (which is node B) in the first exemplary flowchart 1200 and starts at sequential node 8 (which is node T) in the second exemplary flowchart 1220. Since DT is 30%, 30% of nine total nodes is approximately 3 nodes. Thus, the particular sequence in the second exemplary flowchart 1220 needs to be before or after node 2 by not more than 3 nodes. Here, the particular sequence starts at sequential node 8 which is after node 2 but more than 3 nodes, and is thus not permitted by the parameter DT.

Consequently, the merge process produces the merged exemplary flowchart 1240 in which the first exemplary flowchart 1200 and the secondary exemplary flowchart 1220 are merged together. The merged exemplary flowchart 1240 includes an initial branch point 1242 that forms a left branch and a right branch. The left branch includes the first exemplary flowchart 1200 as well as a branch point 1244. The right branch includes the first seven nodes of the second exemplary flowchart 1220. In this example, nodes I and J from the first exemplary flowchart 1200 matches nodes T and U from the second exemplary flowchart 1220, respectively, and thus, such sequential nodes can be combined. Hence, the left branch includes matched nodes, node I/T and node J/U. Following the matched node J/U, the branch point 1244 can branch to end or include nodes K and L.

The various aspects disclosed herein can be utilized with or by robotic process automation systems. Exemplary robotic process automation systems and operations thereof are detailed below.

Figure 13:
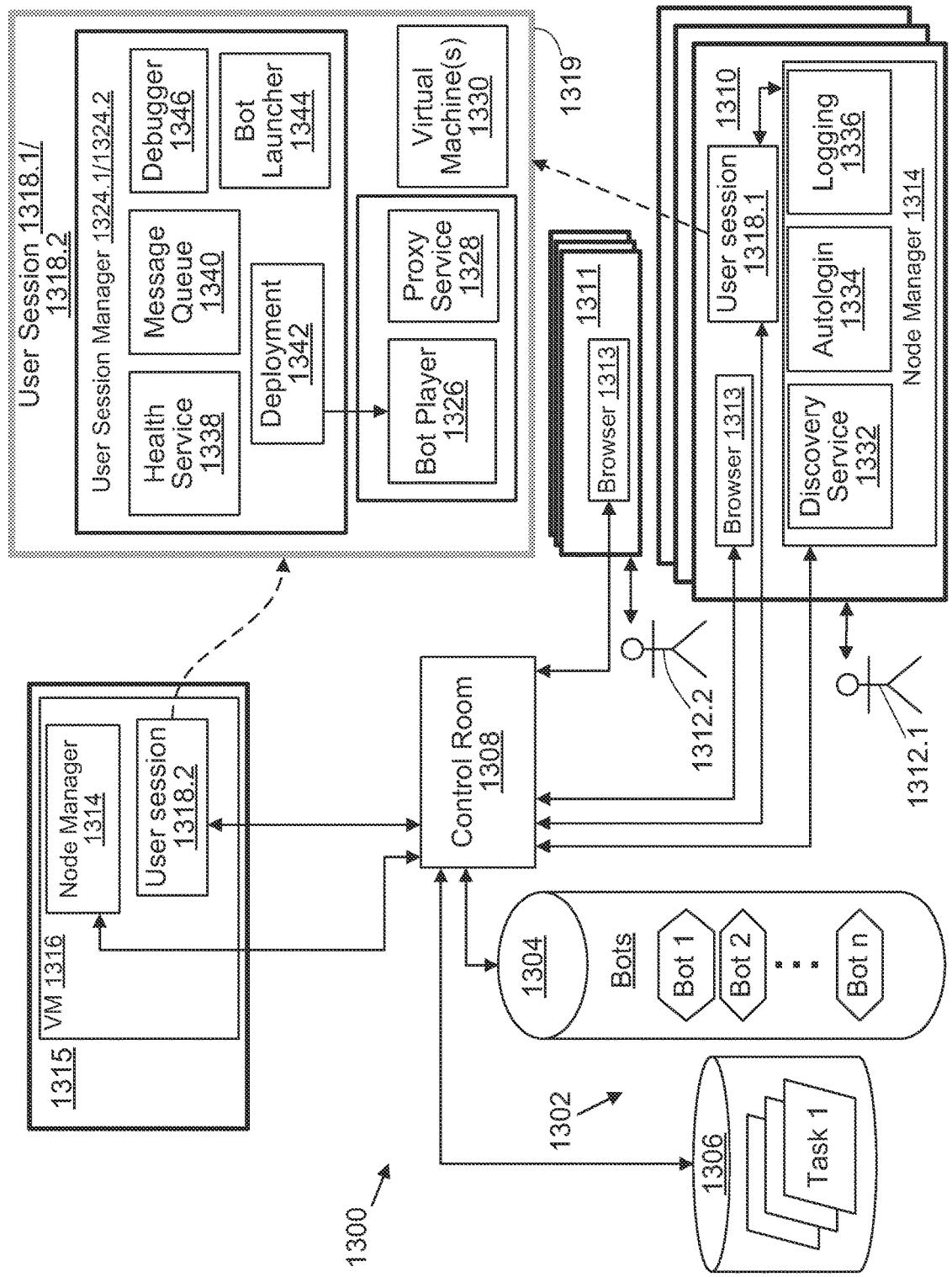
FIG. 13 is a block diagram of a robotic process automation (RPA) system according to one embodiment.

FIG. 13 is a block diagram of a robotic process automation (RPA) system 1300 according to one embodiment. The RPA system 1300 includes data storage 1302. The data storage 1302 can store a plurality of software robots 1304, also referred to as bots (e.g., Bot 1, Bot 2, . . . , Bot n, where n is an integer). The software robots 1304 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 1326), on which a bot will execute or is executing. The data storage 1302 can also stores a plurality of work items 1306. Each work item 1306 can pertain to processing executed by one or more of the software robots 1304.

The RPA system 1300 can also include a control room 1308. The control room 1308 is operatively coupled to the data storage 1302 and is configured to execute instructions that, when executed, cause the RPA system 1300 to respond to a request from a client device 1310 that is issued by a user 1312.1. The control room 1308 can act as a server to provide to the client device 1310 the capability to perform an automation task to process a work item from the plurality of work items 1306. The RPA system 1300 is able to support multiple client devices 1310 concurrently, each of which will have one or more corresponding user session(s) 1318, which provides a context. The context can, for example, include security, permissions, audit trails, etc. to define the permissions and roles for bots operating under the user session 1318. For example, a bot executing under a user session, cannot access any files or use any applications that the user, under whose credentials the bot is operating, does not have permission to do so. This prevents any inadvertent or malicious acts from a bot under which bot 1304 executes.

The control room 1308 can provide, to the client device 1310, software code to implement a node manager 1314. The node manager 1314 executes on the client device 1310 and provides a user 1312 a visual interface via browser 1313 to view progress of and to control execution of automation tasks. It should be noted that the node manager 1314 can be provided to the client device 1310 on demand, when required by the client device 1310, to execute a desired automation task. In one embodiment, the node manager 1314 may remain on the client device 1310 after completion of the requested automation task to avoid the need to download it again. In another embodiment, the node manager 1314 may be deleted from the client device 1310 after completion of the requested automation task. The node manager 1314 can also maintain a connection to the control room 1308 to inform the control room 1308 that device 1310 is available for service by the control room 1308, irrespective of whether a live user session 1318 exists. When executing a bot 1304, the node manager 1314 can impersonate the user 1312 by employing credentials associated with the user 1312.

The control room 1308 initiates, on the client device 1310, a user session 1318 (seen as a specific instantiation 1318.1) to perform the automation task. The control room 1308 retrieves the set of task processing instructions 1304 that correspond to the work item 1306. The task processing instructions 1304 that correspond to the work item 1306 can execute under control of the user session 1318.1, on the client device 1310. The node manager 1314 can provide update data indicative of status of processing of the work item to the control room 1308. The control room 1308 can terminate the user session 1318.1 upon completion of processing of the work item 1306. The user session 1318.1 is shown in further detail at 1319, where an instance 1324.1 of user session manager 1324 is seen along with a bot player 1326, proxy service 1328, and one or more virtual machine(s) 1330, such as a virtual machine that runs Java® or Python®. The user session manager 1324 provides a generic user session context within which a bot 1304 executes.

The bots 1304 execute on a bot player, via a computing device, to perform the functions encoded by the bot. Some or all of the bots 1304 may, in certain embodiments, be located remotely from the control room 1308. Moreover, the devices 1310 and 1311, which may be conventional computing devices, such as for example, personal computers, server computers, laptops, tablets and other portable computing devices, may also be located remotely from the control room 1308. The devices 1310 and 1311 may also take the form of virtual computing devices. The bots 1304 and the work items 1306 are shown in separate containers for purposes of illustration but they may be stored in separate or the same device(s), or across multiple devices. The control room 1308 can perform user management functions, source control of the bots 1304, along with providing a dashboard that provides analytics and results of the bots 1304, performs license management of software required by the bots 1304 and manages overall execution and management of scripts, clients, roles, credentials, security, etc. The major functions performed by the control room 1308 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 1308 is shown generally for simplicity of explanation. Multiple instances of the control room 1308 may be employed where large numbers of bots are deployed to provide for scalability of the RPA system 1300.

In the event that a device, such as device 1311 (e.g., operated by user 1312.2) does not satisfy the minimum processing capability to run a node manager 1314, the control room 1308 can make use of another device, such as device 1315, that has the requisite capability. In such case, a node manager 1314 within a Virtual Machine (VM), seen as VM 1316, can be resident on the device 1315. The node manager 1314 operating on the device 1315 can communicate with browser 1313 on device 1311. This approach permits RPA system 1300 to operate with devices that may have lower processing capability, such as older laptops, desktops, and portable/mobile devices such as tablets and mobile phones. In certain embodiments the browser 1313 may take the form of a mobile application stored on the device 1311. The control room 1308 can establish a user session 1318.2 for the user 1312.2 while interacting with the control room 1308 and the corresponding user session 1318.2 operates as described above for user session 1318.1 with user session manager 1324 operating on device 1310 as discussed above.

In certain embodiments, the user session manager 1324 provides five functions. First is a health service 1338 that maintains and provides a detailed logging of bot execution including monitoring memory and CPU usage by the bot and other parameters such as number of file handles employed. The bots 1304 can employ the health service 1338 as a resource to pass logging information to the control room 1308. Execution of the bot is separately monitored by the user session manager 1324 to track memory, CPU, and other system information. The second function provided by the user session manager 1324 is a message queue 1340 for exchange of data between bots executed within the same user session 1318. The third function is a deployment service (also referred to as a deployment module) 1342 that connects to the control room 1308 to request execution of a requested bot 1304. The deployment service 1342 can also ensure that the environment is ready for bot execution, such as by making available dependent libraries. The fourth function is a bot launcher 1344 which can read metadata associated with a requested bot 1304 and launch an appropriate container and begin execution of the requested bot. The fifth function is a debugger service 1346 that can be used to debug bot code.

The bot player 1326 can execute, or play back, a sequence of instructions encoded in a bot. The sequence of instructions can, for example, be captured by way of a recorder when a human performs those actions, or alternatively the instructions are explicitly coded into the bot. These instructions enable the bot player 1326, to perform the same actions as a human would do in their absence. In one implementation, the instructions can compose of a command (or action) followed by set of parameters. For example, Open Browser is a command and a URL would be the parameter for it to launch a web resource. Proxy service 1328 can enable integration of external software or applications with the bot to provide specialized services. For example, an externally hosted artificial intelligence system can enable the bot to understand the meaning of a "sentence."

The user 1312.1 can interact with node manager 1314 via a conventional browser 1313 which employs the node manager 1314 to communicate with the control room 1308. When the user 1312.1 logs in from the client device 1310 to the control room 1308 for the first time, the user 1312.1 can be prompted to download and install the node manager 1314 on the device 1310, if one is not already present. The node manager 1314 can establish a web socket connection to the user session manager 1324, deployed by the control room 1308 that lets the user 1312.1 subsequently create, edit, and deploy the bots 1304.

Figure 14:
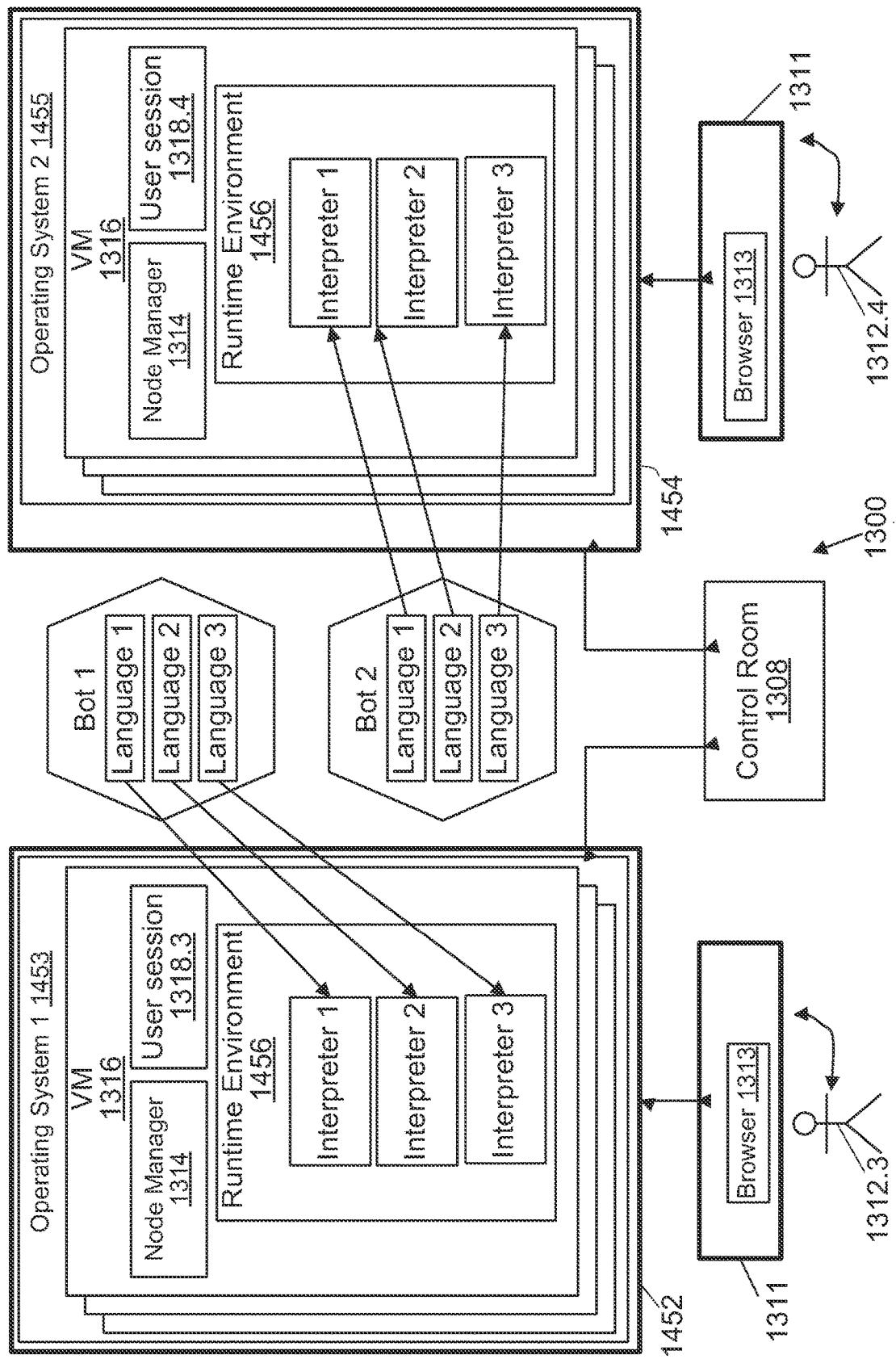
FIG. 14 is a block diagram of a generalized runtime environment for bots in accordance with another embodiment of the RPA system illustrated in FIG. 13.

FIG. 14 is a block diagram of a generalized runtime environment for bots 1304 in accordance with another embodiment of the RPA system 1300 illustrated in FIG. 13. This flexible runtime environment advantageously permits extensibility of the platform to enable use of various languages in encoding bots. In the embodiment of FIG. 14, RPA system 1300 generally operates in the manner described in connection with FIG. 13, except that in the embodiment of FIG. 14, some or all of the user sessions 1318 execute within a virtual machine 1316. This permits the bots 1304 to operate on an RPA system 1300 that runs on an operating system different from an operating system on which a bot 1304 may have been developed. For example, if a bot 1304 is developed on the Windows® operating system, the platform agnostic embodiment shown in FIG. 14 permits the bot 1304 to be executed on a device 1452 or 1454 executing an operating system 1453 or 1455 different than Windows®, such as, for example, Linux. In one embodiment, the VM 1316 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 14, multiple devices 1452 can execute operating system 1, 1453, which may, for example, be a Windows® operating system. Multiple devices 1454 can execute operating system 2, 1455, which may, for example, be a Linux® operating system. For simplicity of explanation, two different operating systems are shown, by way of example and additional operating systems such as the macOS®, or other operating systems may also be employed on devices 1452, 1454 or other devices. Each device 1452, 1454 has installed therein one or more VM's 1316, each of which can execute its own operating system (not shown), which may be the same or different than the host operating system 1453/1455. Each VM 1316 has installed, either in advance, or on demand from control room 1308, a node manager 1314. The embodiment illustrated in FIG. 14 differs from the embodiment shown in FIG. 13 in that the devices 1452 and 1454 have installed thereon one or more VMs 1316 as described above, with each VM 1316 having an operating system installed that may or may not be compatible with an operating system required by an automation task. Moreover, each VM has installed thereon a runtime environment 1456, each of which has installed thereon one or more interpreters (shown as interpreter 1, interpreter 2, interpreter 3). Three interpreters are shown by way of example but any run time environment 1456 may, at any given time, have installed thereupon less than or more than three different interpreters. Each interpreter 1456 is specifically encoded to interpret instructions encoded in a particular programming language. For example, interpreter 1 may be encoded to interpret software programs encoded in the Java® programming language, seen in FIG. 14 as language 1 in Bot 1 and Bot 2. Interpreter 2 may be encoded to interpret software programs encoded in the Python® programming language, seen in FIG. 14 as language 2 in Bot 1 and Bot 2, and interpreter 3 may be encoded to interpret software programs encoded in the R programming language, seen in FIG. 14 as language 3 in Bot 1 and Bot 2.

Turning to the bots Bot 1 and Bot 2, each bot may contain instructions encoded in one or more programming languages. In the example shown in FIG. 14, each bot can contain instructions in three different programming languages, for example, Java®, Python® and R. This is for purposes of explanation and the embodiment of FIG. 14 may be able to create and execute bots encoded in more or less than three programming languages. The VMs 1316 and the runtime environments 1456 permit execution of bots encoded in multiple languages, thereby permitting greater flexibility in encoding bots. Moreover, the VMs 1316 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 1308 will select a device with a VM 1316 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 15:
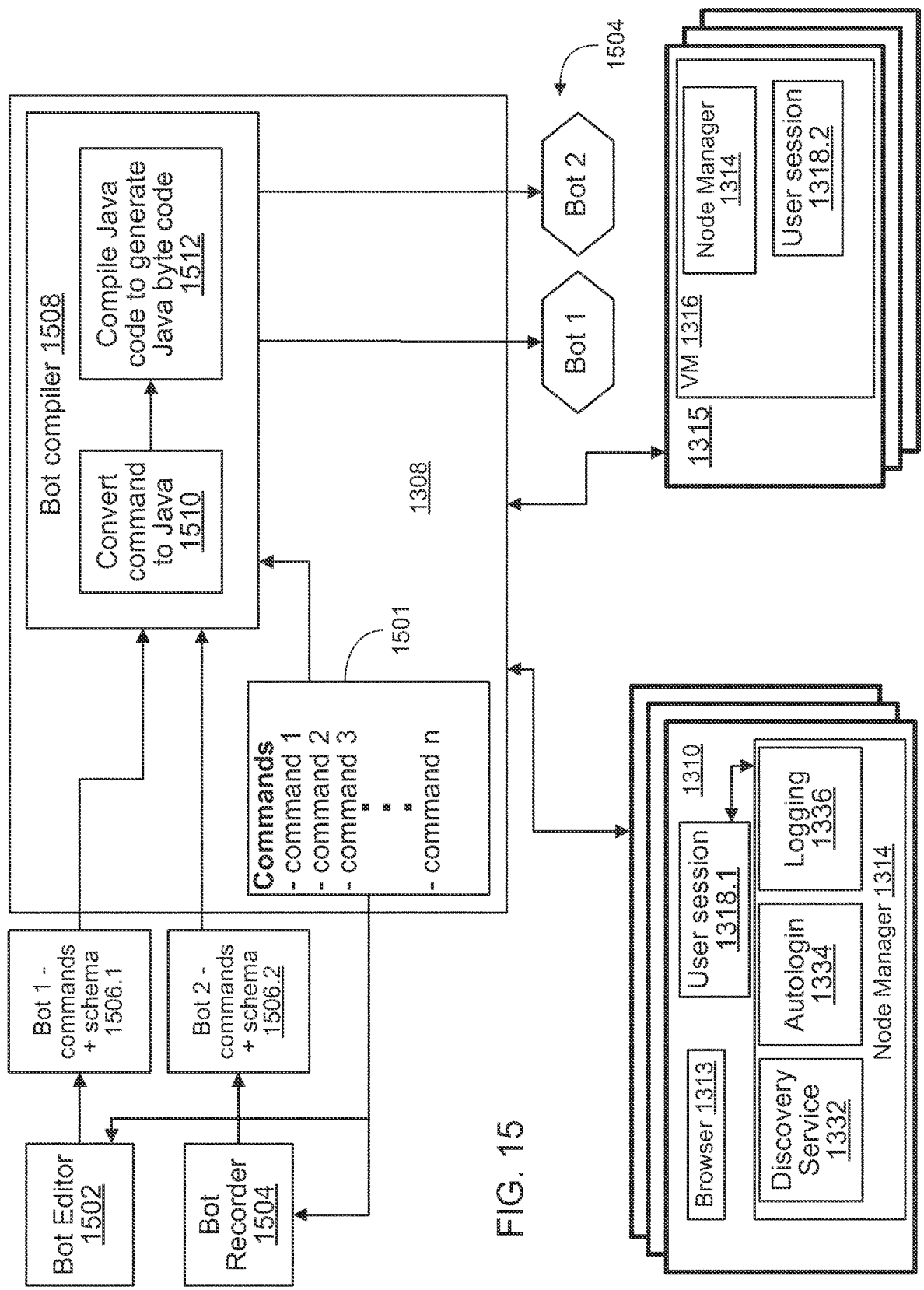
FIG. 15 illustrates yet another embodiment of the RPA system of FIG. 13 configured to provide platform independent sets of task processing instructions for bots.

FIG. 15 illustrates a block diagram of yet another embodiment of the RPA system 1300 of FIG. 13 configured to provide platform independent sets of task processing instructions for bots 1304. Two bots 1304, bot 1 and bot 2 are shown in FIG. 15. Each of bots 1 and 2 are formed from one or more commands 1501, each of which specifies a user level operation with a specified application program, or a user level operation provided by an operating system. Sets of commands 1506.1 and 1506.2 may be generated by bot editor 1502 and bot recorder 1504, respectively, to define sequences of application level operations that are normally performed by a human user. The bot editor 1502 may be configured to combine sequences of commands 1501 via an editor. The bot recorder 1504 may be configured to record application level operations performed by a user and to convert the operations performed by the user to commands 1501. The sets of commands 1506.1 and 1506.2 generated by the editor 1502 and the recorder 1504 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 1308 operates to compile, via compiler 1508, the sets of commands generated by the editor 1502 or the recorder 1504 into platform independent executables, each of which is also referred to herein as a bot JAR (Java ARchive) that perform application level operations captured by the bot editor 1502 and the bot recorder 1504. In the embodiment illustrated in FIG. 15, the set of commands 1506, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 1310 and/or 1315 to perform the encoded application level operations that are normally performed by a human user.

Figure 16:
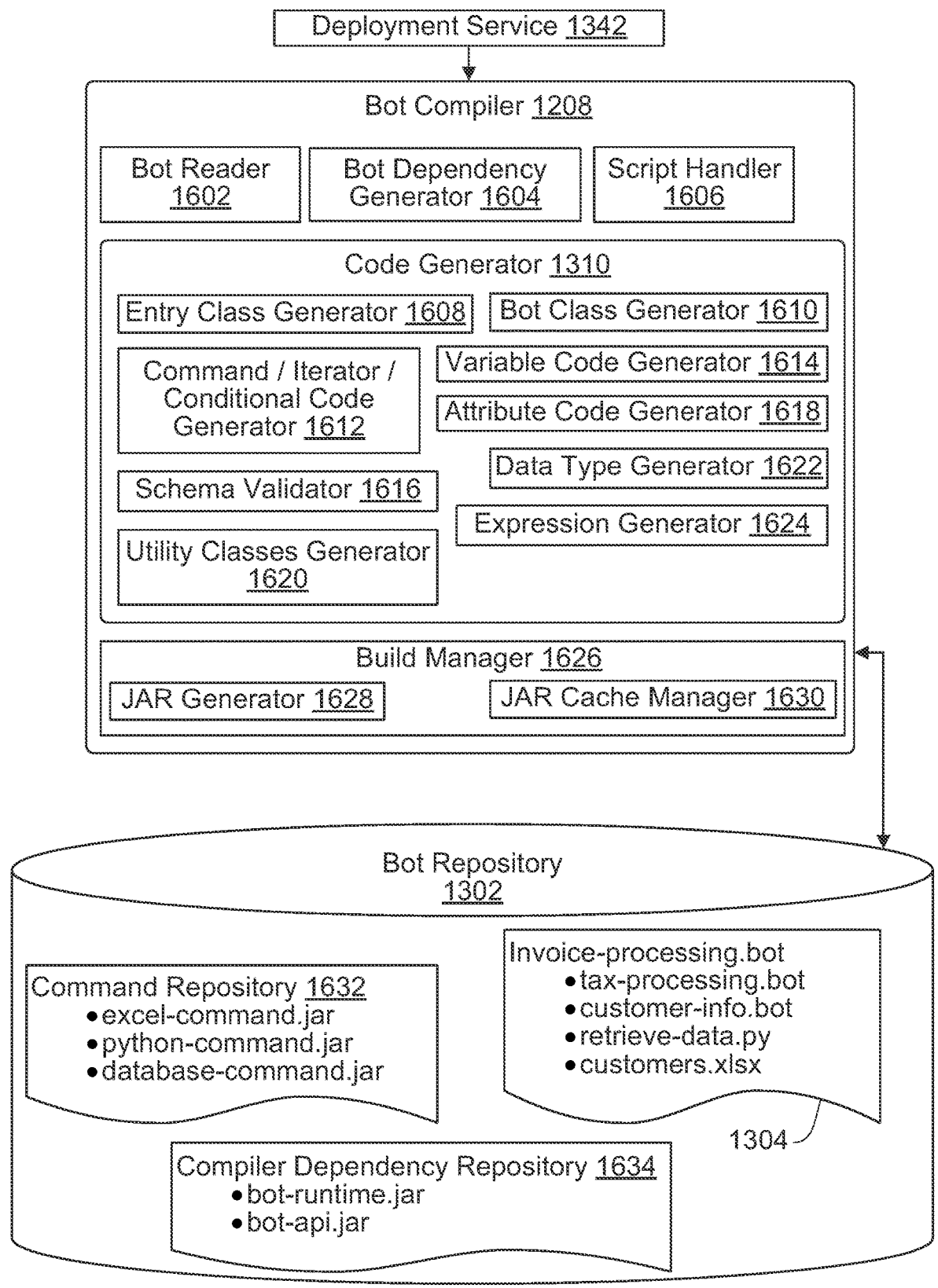
FIG. 16 is a block diagram illustrating details of one embodiment of the bot compiler illustrated in FIG. 15.

FIG. 16 is a block diagram illustrating details of one embodiment of the bot compiler 1508 illustrated in FIG. 15. The bot compiler 1508 accesses one or more of the bots 1304 from the data storage 1302, which can serve as bot repository, along with commands 1501 that are contained in a command repository 1632. The bot compiler 1308 can also access compiler dependency repository 1634. The bot compiler 1308 can operate to convert each command 1501 via code generator module 1510 to an operating system independent format, such as a Java command. The bot compiler 1308 then compiles each operating system independent format command into byte code, such as Java byte code, to create a bot JAR. The convert command to Java module 1510 is shown in further detail in in FIG. 16 by JAR generator 1628 of a build manager 1626. The compiling to generate Java byte code module 1512 can be provided by the JAR generator 1628. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 15, deployment service 1342 can be responsible to trigger the process of bot compilation and then once a bot has compiled successfully, to execute the resulting bot JAR on selected devices 1310 and/or 1315. The bot compiler 1508 can comprises a number of functional modules that, when combined, generate a bot 1304 in a JAR format. A bot reader 1602 loads a bot file into memory with class representation. The bot reader 1602 takes as input a bot file and generates an in-memory bot structure.

A bot dependency generator 1604 identifies and creates a dependency graph for a given bot. It includes any child bot, resource file like script, and document or image used while creating a bot. The bot dependency generator 1604 takes, as input, the output of the bot reader 1602 and provides, as output, a list of direct and transitive bot dependencies. A script handler 1606 handles script execution by injecting a contract into a user script file. The script handler 1606 registers an external script in manifest and bundles the script as a resource in an output JAR. The script handler 1606 takes, as input, the output of the bot reader 1602 and provides, as output, a list of function pointers to execute different types of identified scripts like Python, Java, VB scripts.

An entry class generator 1608 can create a Java class with an entry method, to permit bot execution to be started from that point. For example, the entry class generator 1608 takes, as an input, a parent bot name, such "Invoice-processing.bot" and generates a Java class having a contract method with a predefined signature. A bot class generator 1610 can generate a bot class and orders command code in sequence of execution. The bot class generator 1610 can take, as input, an in-memory bot structure and generates, as output, a Java class in a predefined structure. A Command/Iterator/Conditional Code Generator 1612 wires up a command class with singleton object creation, manages nested command linking, iterator (loop) generation, and conditional (If/Else If/Else) construct generation. The Command/Iterator/Conditional Code Generator 1612 can take, as input, an in-memory bot structure in JSON format and generates Java code within the bot class. A variable code generator 1614 generates code for user defined variables in the bot, maps bot level data types to Java language compatible types, and assigns initial values provided by user. The variable code generator 1614 takes, as input, an in-memory bot structure and generates Java code within the bot class. A schema validator 1616 can validate user inputs based on command schema and includes syntax and semantic checks on user provided values. The schema validator 1616 can take, as input, an in-memory bot structure and generates validation errors that it detects. The attribute code generator 1618 can generate attribute code, handles the nested nature of attributes, and transforms bot value types to Java language compatible types. The attribute code generator 1618 takes, as input, an in-memory bot structure and generates Java code within the bot class. A utility classes generator 1620 can generate utility classes which are used by an entry class or bot class methods. The utility classes generator 1620 can generate, as output, Java classes. A data type generator 1622 can generate value types useful at runtime. The data type generator 1622 can generate, as output, Java classes. An expression generator 1624 can evaluate user inputs and generates compatible Java code, identifies complex variable mixed user inputs, inject variable values, and transform mathematical expressions. The expression generator 1624 can take, as input, user defined values and generates, as output, Java compatible expressions.

The JAR generator 1628 can compile Java source files, produces byte code and packs everything in a single JAR, including other child bots and file dependencies. The JAR generator 1628 can take, as input, generated Java files, resource files used during the bot creation, bot compiler dependencies, and command packages, and then can generate a JAR artifact as an output. The JAR cache manager 1630 can put a bot JAR in cache repository so that recompilation can be avoided if the bot has not been modified since the last cache entry. The JAR cache manager 1630 can take, as input, a bot JAR.

In one or more embodiment described herein command action logic can be implemented by commands 1501 available at the control room 1308. This permits the execution environment on a device 1310 and/or 1315, such as exists in a user session 1318, to be agnostic to changes in the command action logic implemented by a bot 1304. In other words, the manner in which a command implemented by a bot 1304 operates need not be visible to the execution environment in which a bot 1304 operates. The execution environment is able to be independent of the command action logic of any commands implemented by bots 1304. The result is that changes in any commands 1501 supported by the RPA system 1300, or addition of new commands 1501 to the RPA system 1300, do not require an update of the execution environment on devices 1310, 1315. This avoids what can be a time and resource intensive process in which addition of a new command 1501 or change to any command 1501 requires an update to the execution environment to each device 1310, 1315 employed in a RPA system. Take, for example, a bot that employs a command 1501 that logs into an on-online service. The command 1501 upon execution takes a Uniform Resource Locator (URL), opens (or selects) a browser, retrieves credentials corresponding to a user on behalf of whom the bot is logging in as, and enters the user credentials (e.g. username and password) as specified. If the command 1501 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 17:
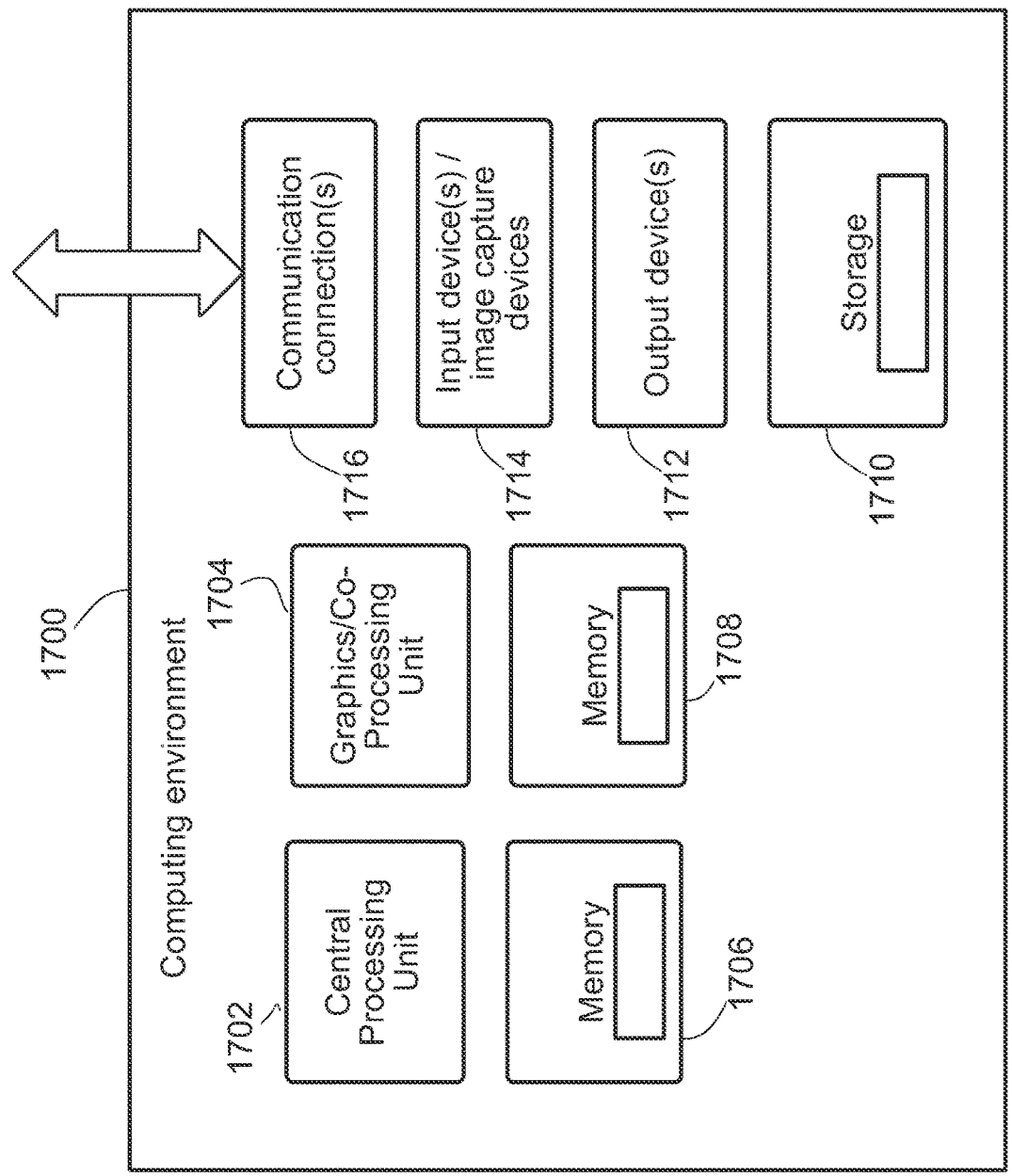
FIG. 17 illustrates a block diagram of an exemplary computing environment for an implementation of an RPA system, such as the RPA systems disclosed herein.

FIG. 17 illustrates a block diagram of an exemplary computing environment 1700 for an implementation of an RPA system, such as the RPA systems disclosed herein. The embodiments described herein may be implemented using the exemplary computing environment 1700. The exemplary computing environment 1700 includes one or more processing units 1702, 1704 and memory 1706, 1708. The processing units 1702, 1706 execute computer-executable instructions. Each of the processing units 1702, 1706 can be a general-purpose central processing unit (CPU), processor in an application-specific integrated circuit (ASIC) or any other type of processor. For example, as shown in FIG. 17, the processing unit 1702 can be a CPU, and the processing unit can be a graphics/co-processing unit (GPU). The tangible memory 1706, 1708 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1700 may be rearranged in various embodiments, and some embodiments may not require nor include all of the above components, while other embodiments may include additional components, such as specialized processors and additional memory.

The exemplary computing environment 1700 may have additional features such as, for example, tangible storage 1710, one or more input devices 1714, one or more output devices 1712, and one or more communication connections 1716. An interconnection mechanism (not shown) such as a bus, controller, or network can interconnect the various components of the exemplary computing environment 1700. Typically, operating system software (not shown) provides an operating system for other software executing in the exemplary computing environment 1700, and coordinates activities of the various components of the exemplary computing environment 1700.

The tangible storage 1710 may be removable or non-removable, and includes magnetic disks, magnetic tapes or cassettes, CD-ROMs, DVDs, or any other medium which can be used to store information in a non-transitory way, and which can be accessed within the computing system 1700. The tangible storage 1710 can store instructions for the software implementing one or more features of a PRA system as described herein.

The input device(s) or image capture device(s) 1714 may include, for example, one or more of a touch input device such as a keyboard, mouse, pen, or trackball, a voice input device, a scanning device, an imaging sensor, touch surface, or any other device capable of providing input to the exemplary computing environment 1700. For multimedia embodiment, the input device(s) 1714 can, for example, include a camera, a video card, a TV tuner card, or similar device that accepts video input in analog or digital form, a microphone, an audio card, or a CD-ROM or CD-RW that reads audio/video samples into the exemplary computing environment 1700. The output device(s) 1712 can, for example, include a display, a printer, a speaker, a CD-writer, or any another device that provides output from the exemplary computing environment 1700.

The one or more communication connections 1716 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A robotic process automation system, comprising:
   one or more processors;
   a data store configured to store a plurality of recordings, each recording pertaining to a series of user-initiated events with one or more software programs operating on one or more computing devices;
   at least one recording pre-processor, the at least one recording pre-processor being configured to (i) process each of the one or more of the recordings to determine identifiers for the user-initiated events within the each of the one or more recordings, (ii) form a digital representation for each of the one or more recordings, and (iii) examine each of the one or more recordings for repeating sequence of events in the corresponding recording to determine at least one repeating sequence in the one or more recordings;
   an aggregator configured to be executed by the one or more processors to combine two or more of the digital representations for two or more the recordings to form an aggregated recording digital representation, wherein the aggregator includes at least (i) a match detection module configured to detect matching user-initiated events present in each of the two or more of the digital representations for two or more of the recordings, and (ii) a merge digital representations module configured to merge the two or more of the digital representations for two or more of the recordings to form the aggregated recording digital representation; and
   a software automation process generator configured to be executed by the one or more processors to create a software automation process based on the aggregated recording digital representation, wherein the created software automation process is executable by at least other processor or the one or more processors to perform software automation in accordance with the aggregated recording digital representation.

2. The robotic process automation system as recited in claim 1, wherein the at least one recording pre-processor of the at least one recording pre-processor comprises:
   (iv) modify the digital representation of the one or more recordings to reflect the at least one determined repeating sequence of events.

3. The robotic process automation system as recited in claim 2, wherein at least one of the two or more digital representations being the modified by the at least one pre-processor is the modified digital representation.

4. The robotic process automation system as recited in claim 1, wherein the at least one recording pre-processor comprises:
   a contextual identification module configured to be executed by the one or more processors to determine a plurality of contextual identifiers that together form the identifier for each of the user-initiated events within the recording; and
   a digital representation formation module configured to form the digital representations for each of the one or more recordings.

5. The robotic process automation system as recited in claim 4, wherein the at least one recording pre-processor comprises:
   a repeating sequence identification module configured to be executed by the one or more processors to determine whether a repeating sequence of user-initiated events is found within the digital representation for any of the one or more recordings.

6. The robotic process automation system as recited in claim 1, wherein the match detection module determines whether a repeating sequence of user-initiated events is found in both of the digital representations for the two or more of the recordings, as a matching repeating sequence.

7. The robotic process automation system as recited in claim 6, wherein the merge digital representations module determines whether to merge the two or more of the digital representations for the two or more of the recordings to form the aggregated recording digital representation based on the matching repeating sequence.

8. The robotic process automation system as recited in claim 7, wherein the merge digital representations module determines whether to form a new branch or add into an existing branch of the aggregated recording digital representation based on at least one predetermined parameter.

9. The robotic process automation system as recited in claim 8, wherein the at least one predetermined parameter includes (i) a minimum number of consecutive matching steps, and/or (ii) a minimal percentage (%) of steps that match with the existing branch for the other flowchart to be merged into that branch.

10. The robotic process automation system as recited in claim 9, wherein the at least one recording pre-processor (ii) forms a digital representation for each of the one or more recordings using at least a plurality of the identifiers for the user-initiated events.

11. A computer-implemented method for creating a software automation process for use with a robotic process automation system, the method comprising:
determining a plurality of contextual identifiers for each of a plurality of events from a first recording of a first series of events involving one or more software programs operating on one or more computing devices;
determining a plurality of contextual identifiers for each of a plurality of events from a second recording of a second series of events involving one or more software programs operating on one or more computing devices;
forming a representation for the first series of events from the first recording;
forming a representation for the second series of events from the second recording;
identifying one or more events from the events in the first series of events that match one or more events from the events in the second series of events, the identifying of the one or more events that match is performed based at least on the plurality of contextual identifiers pertaining to the corresponding events in the first series of events and the second series of events;
combining the representation of the first series of events with the representation of the second series of events to form a combined representation, the combining being dependent on the identified one or more events that match, the combining including at least merging the representation of the first series of events with the representation for the second series of events, the merging being dependent on the one or more events that match events to form the combined representation;
producing a software automation process based on the combined representation; and
executing the software automation process to perform software automation in accordance with the combined representation.

12. The computer-implemented method as recited in claim 11, wherein the computer-implemented method comprises:
identifying a repeating sequence of events in the first series of events; and
modifying the representation of the first series of events to reflect the identified repeating sequence of events.

13. The computer-implemented method as recited in claim 12, wherein the modifying the representation of the first series of events to reflect the identified repeating sequence of events comprises inserting a loop into the representation of the first series of events.

14. The computer-implemented method as recited in claim 11, wherein the identified one or more events that match are merged together in the combined representation.

15. The computer-implemented method as recited in claim 11, wherein the plurality of contextual identifiers includes two or more of the following: application name, action, action type, class name, or user interface name.

16. The computer-implemented method as recited in claim 11, wherein the first recording is associated with performance of a task using the one or more software programs operating on the one or more computing devices, and wherein the second recording is associated with performance of the same task using the one or more software programs operating on the one or more computing devices.

17. A computer-implemented method for creating a software automation process for use with a robotic process automation system, the method comprising:
determining a plurality of contextual identifiers for each of a plurality of events from a first recording of a first series of events involving one or more software programs operating on one or more computing devices;
determining a plurality of contextual identifiers for each of a plurality of events from a second recording of a second series of events involving one or more software programs operating on one or more computing devices;
forming a digital representation for the first recording, the digital representation for the first recording including at least the events in the first series of events and the plurality of contextual identifiers therefor;
forming a digital representation for the second recording, the digital representation for the second recording including at least the events in the second series of events and the plurality of contextual identifiers therefor;
combining the digital representation for the first recording with the digital representation for the second recording to form a combined digital representation, the combining including at least (i) determining matching events that are present in the digital representation for the first recording and the digital representation for the second recording, and (ii) merging the digital representation for the first recording with the digital representation for the second recording, the merging being dependent on the matching events to form the combined digital representation; and
producing a software automation process to carry out the combined representation, whereby the events from the first recording and the second recording are able to be programmatically performed without user interaction by execution of the software automation process.

18. The computer-implemented method as recited in claim 17,
wherein the digital representation for the first recording is stored in an electronic file that stores data in a text-based format for representing structured data, and
wherein the digital representation for the second recording is stored in an electronic file that stores data in a text-based format for representing structured data.

19. The computer-implemented method as recited in claim 17, wherein the combining comprises:
determining whether to form a branch for a plurality of the events of second series of events from the second recording when combining the digital representation for the second recording with the digital representation for the first recording.

20. A non-transitory computer readable medium including at least computer program code tangible stored thereon for creating a software automation process for use with a robotic process automation system, the computer readable medium comprising:

computer program code for determining a plurality of contextual identifiers for each of a plurality of events from a first recording of a first series of events involving one or more software programs operating on one or more computing devices;

computer program code for determining a plurality of contextual identifiers for each of a plurality of events from a second recording of a second series of events involving one or more software programs operating on one or more computing devices;

computer program code for forming a representation for the first series of events from the first recording;

computer program code for forming a representation for the second series of events from the second recording;

computer program code for identifying one or more events from the events in the first series of events that match one or more events from the events in the second series of events, the identifying of the one or more events that match is performed based at least on the plurality of contextual identifiers pertaining to the corresponding events in the first series of events and the second series of events;

computer program code for combining the representation of the first series of events with the representation of the second series of events to form a combined representation, the combining being dependent on the identified one or more events that match, the combining including at least (i) determining matching events that are present in the representation of the first series of events and the representation of the second series of events, and (ii) merging the representation of the first series of events with the representation for the second series of events, the merging being dependent on the matching events to form the combined representation;

computer program code for producing a software automation process based on the combined representation; and computer program code for executing the software automation process to perform software automation in accordance with the combined representation.

21. A robotic process automation system, comprising:

one or more processors; and a memory operatively coupled to the one or more processors, the memory containing instructions executed by the processor to cause the one or more processors to perform a process comprising:

determining a plurality of contextual identifiers for each of a plurality of events from a first recording of a first series of events involving one or more software programs operating on one or more computing devices;

determining a plurality of contextual identifiers for each of a plurality of events from a second recording of a second series of events involving one or more software programs operating on one or more computing devices;

forming a representation for the first series of events from the first recording;

forming a representation for the second series of events from the second recording;

identifying one or more events from the events in the first series of events that match one or more events from the events in the second series of events, the identifying of the one or more events that match is performed based at least on the plurality of contextual identifiers pertaining to the corresponding events in the first series of events and the second series of events;

identifying a repeating sequence of events in the first series of events;

modifying the representation of the first series of events to reflect the identified repeating sequence of events;

combining the modified representation of the first series of events with the representation of the second series of events to form a combined representation, the combining being dependent on the identified one or more events that match; and producing a software automation process to carry out the combined representation.

* * * * *